US011652282B2

(12) United States Patent
Yang et al.

(10) Patent No.: US 11,652,282 B2
(45) Date of Patent: May 16, 2023

(54) LIQUID CRYSTAL ANTENNA

(71) Applicant: Chengdu Tianma Micro-Electronics Co., Ltd., Chengdu (CN)

(72) Inventors: Zuocai Yang, Chengdu (CN); Qinyi Duan, Chengdu (CN); Ning He, Chengdu (CN); Donghua Wang, Chengdu (CN); Yingru Hu, Chengdu (CN); Kerui Xi, Shanghai (CN); Zhenyu Jia, Shanghai (CN); Jinhao Shen, Chengdu (CN)

(73) Assignee: CHENGDU TIANMA MICRO-ELECTRONICS CO., LTD., Chengdu (CN)

( * ) Notice: Subject to any disclaimer, the term of this patent is extended or adjusted under 35 U.S.C. 154(b) by 64 days.

(21) Appl. No.: 17/447,211

(22) Filed: Sep. 9, 2021

(65) Prior Publication Data

US 2023/0006340 A1 Jan. 5, 2023

(30) Foreign Application Priority Data

Jun. 30, 2021 (CN) .......................... 202110732742.3

(51) Int. Cl.
| | |
|---|---|
| *H01Q 1/36* | (2006.01) |
| *H01Q 1/48* | (2006.01) |
| *H01Q 21/06* | (2006.01) |
| *G02F 1/13* | (2006.01) |

(52) U.S. Cl.
CPC .............. *H01Q 1/364* (2013.01); *H01Q 1/48* (2013.01); *H01Q 21/065* (2013.01); *G02F 1/1313* (2013.01)

(58) Field of Classification Search
CPC ........ H01Q 1/364; H01Q 21/065; G02F 1/13; G02F 1/1313
See application file for complete search history.

(56) References Cited

U.S. PATENT DOCUMENTS

| | | | |
|---|---|---|---|
| 2009/0153509 A1* | 6/2009 | Jiang ..................... | G06F 3/0416 345/173 |
| 2019/0064609 A1* | 2/2019 | Haziza ................. | G09G 3/3648 |
| 2020/0243957 A1* | 7/2020 | Ueda ........................ | H01Q 1/38 |
| 2022/0285852 A1* | 9/2022 | Xi ......................... | H01Q 19/005 |
| 2022/0294112 A1* | 9/2022 | Kausar ..................... | H01Q 5/30 |

FOREIGN PATENT DOCUMENTS

| | | |
|---|---|---|
| CN | 101458601 B | 3/2012 |
| CN | 104777690 B | 3/2018 |
| CN | 108140946 B | 8/2020 |

\* cited by examiner

*Primary Examiner* — Ricardo I Magallanes
(74) *Attorney, Agent, or Firm* — Anova Law Group PLLC

(57) ABSTRACT

A liquid crystal antenna is provided. The liquid crystal antenna includes a first substrate, a second substrate, a liquid crystal layer, a plurality of transmission electrodes including a first transmission electrode and a second transmission electrode, a plurality of signal lines including a first signal line and a second signal line, a plurality of signal terminals including a first signal terminal and a second signal terminal, and a ground electrode. A transmission electrode is electrically connected to a signal terminal through at least one signal line. The first transmission electrode is connected to the first signal terminal through the first signal line, and the second transmission electrode is connected to the second signal terminal through the second signal line. A resistance of the first signal line is A, and a resistance of the second signal line is B, where A/B is less than 10.

20 Claims, 22 Drawing Sheets

LIQUID CRYSTAL ANTENNA

CROSS-REFERENCE TO RELATED APPLICATION

This application claims the priority of Chinese patent application No. 202110732742.3, filed on Jun. 30, 2021, the entirety of which is incorporated herein by reference.

FIELD

The present disclosure generally relates to the field of wireless communication technology and, more particularly, relates to a liquid crystal antenna.

BACKGROUND

A liquid crystal antenna is a new type of array antenna based on a liquid crystal phase shifter, and has been widely used in satellite receiving antenna, vehicle radar, base station antenna and any other field. The liquid crystal phase shifter is a core component of the liquid crystal antenna. An electric field is formed between the liquid crystal phase shifter and a ground layer to control the deflection of liquid crystal molecules, thereby achieving the control of an equivalent dielectric constant of the liquid crystal, and achieving the adjustment of the phase of the electromagnetic wave.

Based on different frequencies and radiation ranges, the liquid crystal antenna has put different requirements on the internal phase-shifting device, for example, the size and quantity of transmission electrodes used to transmit microwave signals are different. The quantity of transmission electrodes of a conventional small antenna is in a range of approximately 16-64, but large array antennas need hundreds of transmission electrodes, and each transmission electrode needs to have at least one wire connected to the power supply terminal on the step of the liquid crystal antenna to independently control each transmission electrode after being energized. Therefore, the wire connected to the transmission electrode farthest from the step becomes very long and the resistance increases, which increases the charging time period of the transmission electrode at the far end of the power supply terminal, and causes the phases of the transmission electrodes at the far end and near end of the power supply terminal to be unable to output synchronously. Thus, the phase control accuracy is not high, which further affects the gain of the antenna and the consistency and phase accuracy of the entire antenna.

Therefore, how to solve the difference in the liquid crystal deflection electric fields between the transmission electrodes in the liquid crystal antenna, thereby solving the issue of precise phase control of the transmission electrode, making the phase control response substantially fast and accurate, and improving the performance of the liquid crystal antenna, is an urgent technical problem that needs to be solved.

SUMMARY

One aspect of the present disclosure provides a liquid crystal antenna. The liquid crystal antenna includes a first substrate and a second substrate that are oppositely disposed, and a liquid crystal layer disposed between the first substrate and the second substrate. The liquid crystal antenna also includes a plurality of transmission electrodes arranged in an array and a plurality of signal lines that are disposed on a side of the first substrate facing toward the second substrate, and a ground electrode disposed on a side of the second substrate facing toward the first substrate. Further, the liquid crystal antenna includes a first region and at least one binding region. The first region and a binding region of the at least one binding region are arranged along a first direction. The plurality of transmission electrodes are located in the first region, and a plurality of signal terminals sequentially arranged along a second direction are located in the binding region, where the first direction intersects the second direction. A transmission electrode of the plurality of transmission electrodes is electrically connected to a signal terminal of the plurality of signal terminals through at least one signal line of the plurality of signal lines. Along the first direction, the plurality of transmission electrodes at least include a first transmission electrode and a second transmission electrode, and the first transmission electrode is located on a side of the second transmission electrode away from the binding region. The plurality of signal lines at least include a first signal line and a second signal line, and the plurality of signal terminals at least include a first signal terminal and a second signal terminal. The first transmission electrode is connected to the first signal terminal through the first signal line, and the second transmission electrode is connected to the second signal terminal through the second signal line. A resistance of the first signal line is A, and a resistance of the second signal line is B, where A/B is less than 10.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION OF THE DISCLOSURE

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Similar reference numbers and letters represent similar terms in the following Figures, such that once an item is defined in one Figure, it does not need to be further discussed in subsequent Figures.

Figure 1:
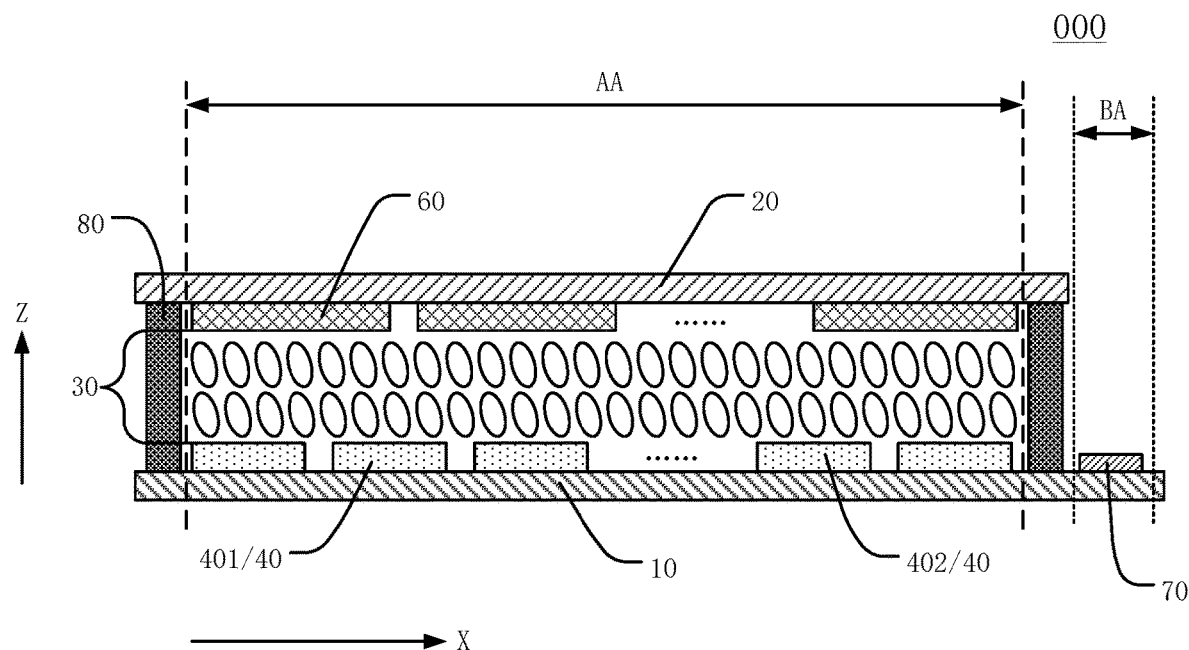
FIG. 1 illustrates a schematic diagram of an exemplary liquid crystal antenna consistent with disclosed embodiments of the present disclosure.
Figure 2:
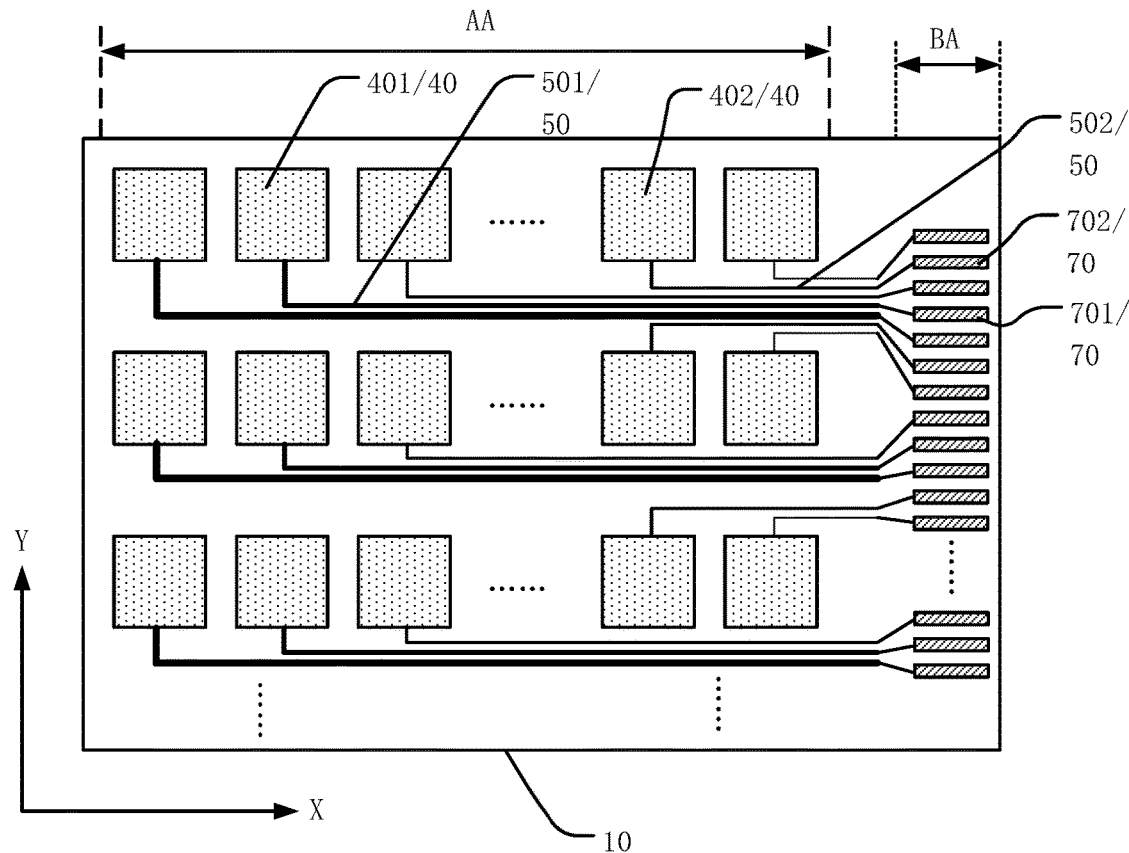
FIG. 2 illustrates a schematic top view of a side of an exemplary first substrate facing toward a second substrate in FIG. 1 consistent with disclosed embodiments of the present disclosure.

The present disclosure provides a liquid crystal antenna. FIG. 1 illustrates a schematic diagram of a liquid crystal antenna consistent with disclosed embodiments of the present disclosure; and FIG. 2 illustrates a schematic top view of a side of a first substrate facing toward a second substrate in FIG. 1. To clearly illustrate the structure of the liquid crystal antenna, the first substrate in FIG. 2 may not be filled. Referring to FIG. 1 and FIG. 2, the liquid crystal antenna 000 may include a first substrate 10 and a second substrate 20 that are oppositely disposed, and a liquid crystal layer 30 disposed between the first substrate 10 and the second substrate 20.

A plurality of transmission electrodes 40 arranged in an array and a plurality of signal lines 50 may be disposed on a side of the first substrate 10 facing toward the second substrate 20. A ground electrode 60 may be disposed on a side of the second substrate 20 facing toward the first substrate 10.

The liquid crystal antenna 000 may include a first region AA and at least one binding region BA. The first region AA and a binding region BA of the at least one binding region BA may be arranged along a first direction X. The transmission electrode 40 may be located in the first region AA, and the binding region BA may include a plurality of signal terminals 70 sequentially arranged in a second direction Y. The transmission electrode 40 may be electrically connected to the signal terminal 70 through at least one signal line 50. The first direction X may intersect the second direction Y.

Along the first direction X, the plurality of transmission electrodes 40 may at least include a first transmission electrode 401 and a second transmission electrode 402. The first transmission electrode 401 may be located on the side of the second transmission electrode 402 away from the binding region BA.

The plurality of signal lines 50 may at least include a first signal line 501 and a second signal line 502. The plurality of signal terminals 70 may at least include a first signal terminal 701 and a second signal terminal 702. The first transmission electrode 401 may be connected to the first signal terminal 701 through the first signal line 501, and the second transmission electrode 402 may be connected to the second signal terminal 702 through the second signal line 502.

A resistance of the first signal line 501 may be A, and a resistance of the second signal line 502 may be B, where A/B may be less than 10.

In the present disclosure, the liquid crystal antenna 000 may include the first substrate 10 and the second substrate 20 that are oppositely disposed, and the liquid crystal layer 30 disposed between the first substrate 10 and the second substrate 20. The plurality of transmission electrodes 40 arranged in an array and the plurality of signal lines 50 may be disposed on the side of the first substrate 10 facing toward the second substrate 20. In one embodiment, the transmission electrode 40 may be a phase shifter electrode for transmitting a microwave signal. The phase shifter electrode may be a microstrip line, and the microstrip line may have a serpentine shape, a spiral shape, or any other structure. A block diagram in FIG. 2 may be used to illustrate the transmission electrode 40, which may not indicate the actual shape of the transmission electrode. As long as the transmission electrode is capable of transmitting the microwave signal, the shape of the transmission electrode 40 may not be limited by the present disclosure.

The ground electrode 60 may be disposed on the side of the second substrate 20 facing toward the first substrate 10. In one embodiment, in a direction Z perpendicular to the plane of the first substrate 10, the liquid crystal layer 30 may be disposed between the transmission electrode 40 and the ground electrode 60. The microwave signal may be transmitted between the transmission electrode 40 and the ground electrode 60. During the transmission of the microwave signal, by controlling the voltages on the transmission electrode 40 and the ground electrode 60, the intensity of the electric field formed between the transmission electrode 40 and the ground electrode 60 may be controlled, and then the deflection angle of the liquid crystal molecules of the liquid crystal layer 30 in the corresponding space may be adjusted, thereby achieving the effect of changing the phase of the microwave.

It should be understood that the specific quantity, distribution, and materials of the transmission electrodes 40 disposed on the side of the first substrate 10 facing toward the second substrate 20 may be determined according to actual conditions, which may not be limited herein. In one embodiment, the transmission electrode 40 may be made of copper. Referring to FIG. 2, the plurality of transmission electrodes 40 may be uniformly distributed on the first substrate 10 in an array structure.

The liquid crystal antenna 000 in the present disclosure may include the first region AA and at least one binding region BA. The first region AA and the binding region BA may be arranged in the first direction X. Each transmission electrode 40 may be located in the first region AA, and the plurality of signal terminals 70 sequentially arranged along the second direction Y may be located in the binding region BA. In one embodiment, the first direction X and the second direction Y may be perpendicular to each other in a direction parallel to the plane of the first substrate 10.

An edge of the first substrate 10 may be beyond an edge of the second substrate 20 at a same side, and the excess portion may be a step region of the liquid crystal antenna 000, which may be used as the binding region BA. In view of this, the plurality of signal terminals 70 may be disposed on the side of the first substrate 10 facing toward the second substrate 20. The transmission electrode 40 may be electrically connected to the signal terminal 70 through at least one signal line 50, and each transmission electrode 40 may be independently controlled by at least one signal line 50 electrically connected to the signal terminal 70. In other words, the signal line 50 may be configured to transmit the voltage signal provided by the signal terminal 70 to the transmission electrode 40, thereby controlling the deflection electric field of the liquid crystal molecules of the liquid crystal layer 30. It should be understood that the signal line 50 may be loaded with a voltage signal provided by the signal terminal 70. Optionally, the ground electrode 60 may be electrically connected to a signal terminal 70 in the binding region BA, and the ground electrode may be connected with a ground signal through the signal terminal 70 in the binding region BA.

In one embodiment, along the first direction X (e.g., the arrangement direction of the first region AA where the transmission electrode 40 is located and the binding region BA where the signal terminal 70 is located), the plurality of transmission electrodes 40 may at least include the first transmission electrode 401 and the second transmission electrode 402. The first transmission electrode 401 may be disposed on the side of the second transmission electrode 402 away from the binding region BA. In other words, for any two first transmission electrode 401 and the second transmission electrode 402 (which may be two adjacent transmission electrodes in the first direction X, or may be two non-adjacent transmission electrodes), with respect to the binding region BA, the first transmission electrode 401 may be located at the far end of the binding region BA, and the second transmission electrode 402 may be located at the near end of the binding region BA.

The plurality of signal lines 50 may at least include the first signal line 501 and the second signal line 502. The plurality of signal terminals 70 may at least include the first signal terminal 701 and the second signal terminal 702. The first signal line 501 may be configured to achieve the signal transmission between the first signal terminal 701 in the binding region BA and the first transmission electrode 401 in the first region AA, and the second signal line 502 may be configured to achieve the signal transmission between the second signal terminal 702 in the binding region BA and the second transmission electrode 402 in the first region AA.

In one embodiment, the resistance of the first signal line 501 may be A, and the resistance of the second signal line 502 may be B, where A/B may be less than 10. In other words, although along the first direction X, the distance between the first transmission electrode 401 and the binding region BA is different from the distance between the second transmission electrode 402 and the binding region BA, the resistance difference of the signal lines 50 connected to the any two transmission electrodes 40 with different distances from the binding region BA may be substantially small. A ratio of the resistance of the first signal line 501 connected to a transmission electrode 401 at the far end over the resistance of the second signal line 502 connected to the second transmission electrode 402 at the near end may be less than 10.

Therefore, the resistance difference between different signal lines 50 connected to the transmission electrode 40 at the far end and the transmission electrode 40 at the near end may be minimized as much as possible. Thus, the time periods of charging the two transmission electrodes 40 through different signal lines 50 may be consistent as much as possible, and the intensity difference of the liquid crystal deflection electric fields at different positions may be reduced. Further, the fast or slow charging time period caused by the different resistance of the signal line 50 connected to the transmission electrode 40 at the far end and the signal line 50 connected to the transmission electrode 40 at the near end may be prevented.

For example, the transmission electrode 40 at the near end may be charged fast due to the small resistance of the signal line 50 connected thereto, and the transmission electrode 40 at the far end may be charged slow due to the large resistance of the signal line 50 connected thereto. Thus, at a same time, the electric field between the transmission electrode 40 at the far end and the ground electrode 60 may not achieve a same intensity as the electric field between the transmission electrode 40 at the near end and the ground electrode 60. Further, the intensities of the liquid crystal deflection electric fields at the far end and the near end may be different, which may cause a difference in the deflection of liquid crystal molecules, may cause an inaccurate phase control, and may affect the performance of the antenna. In the present disclosure, the phase of the transmission electrode 40 at the far end and the phase of the transmission electrode 40 at the near end may be synchronously outputted as much as possible, and the phase control of the liquid crystal antenna 000 may be substantially accurate, which may facilitate to improve the gain of the liquid crystal antenna and the phase accuracy of the entire liquid crystal antenna.

In one embodiment, because along the first direction X, the distance between the first transmission electrode 401 and the binding region BA is different from the distance between the second transmission electrode 402 and the binding region BA, the first signal line 501 may have a length different from the second signal line 502, which may easily cause the resistance of the first signal line 501 to be different from the resistance of the second signal line 502 and may cause different signal transmission effects. For example, under the same other conditions, the first signal line 501 may have a larger length, and, thus, may have a larger resistance, the second signal line 502 may have a smaller length, and, thus, may have a smaller resistance. Therefore, to reduce the resistance difference between different signal lines 50 connected to the transmission electrode 40 at the far end and the transmission electrode 40 at the near end, the resistance difference may be adjusted by reducing a width of the second signal line 502 connected to the second transmission electrode 402 at the near end or by increasing a width of the first signal line 501 connected to the first transmission electrode 401 at the far end.

It should be understood that how to control the ratio of the resistance A of the first signal line 501 over the resistance B of the second signal line 502 to be less than 10 may not be limited by the present disclosure. In specific implementation, by changing the material, the width, the cross-sectional area, and the length, etc., of the signal line 50, the value of A/B may be less than 10, to reduce the resistance difference as much as possible (in conjunction with a wire resistance calculation formula $R=\rho L/S$, where $\rho$ represents a resistivity of the wire material, which is determined by its own material, L represents a length of the wire, and S represents a cross-sectional area of the wire). For example, referring to FIG. 2, in a case where the first signal line 501 is made of a same material as the second signal line 502, and along the direction Z perpendicular to the plane of the first substrate 10, the first signal line 501 has a same thickness as the second signal line 502, the first signal line 501 may have a width greater than the second signal line 502. In other words, the second signal line 502 connected to the second transmission electrode 402 at the near end may be narrower than the first signal line 501 connected to the first transmission electrode 401 at the far end.

It should be understood that the first substrate 10, the second substrate 20, and the liquid crystal layer 30 may form a liquid crystal cell, and the specific process of forming the liquid crystal cell may be determined by those skilled in the art according to actual situations, which may not be limited herein. In one embodiment, the frame sealant 80 may be coated on the first substrate 10, and then the liquid crystal may be dispersed by a liquid crystal injection technology, and ultimately the first substrate 10 and the second substrate 20 may be aligned and bonded according to the alignment marks thereon. The frame sealant 80 may be cured to make the first substrate 10 and the second substrate 20 be stably bonded, to form the liquid crystal cell. Specifically, the materials of the first substrate 10 and the second substrate 20 may be determined by those skilled in the art according to the actual situation, which may not be limited herein. For illustrative purposes, the first substrate 10 and the second substrate 20 may be a rigid substrate, such as a glass substrate.

It should be noted that the present disclosure may merely exemplarily illustrate the structure of the liquid crystal antenna 000, which may not be limited to such structure and may also include any other structure, such as an alignment layer between the first substrate 10 and the second substrate 20, etc. The structure of the liquid crystal antenna 000 may be understood with reference to the structure of the liquid crystal antenna in the related art, which may not be described in detail herein.

It should be explained that FIG. 2 merely exemplarily illustrates an arrangement of the signal lines 50 on the side of the first substrate 10 facing toward the second substrate 20, which may not indicate the actual arrangement of the signal lines 50. In practical applications, the signal lines 50 may be flexibly arranged according to the space of the first substrate 10, which may not be specifically limited by the present disclosure.

Figure 3:
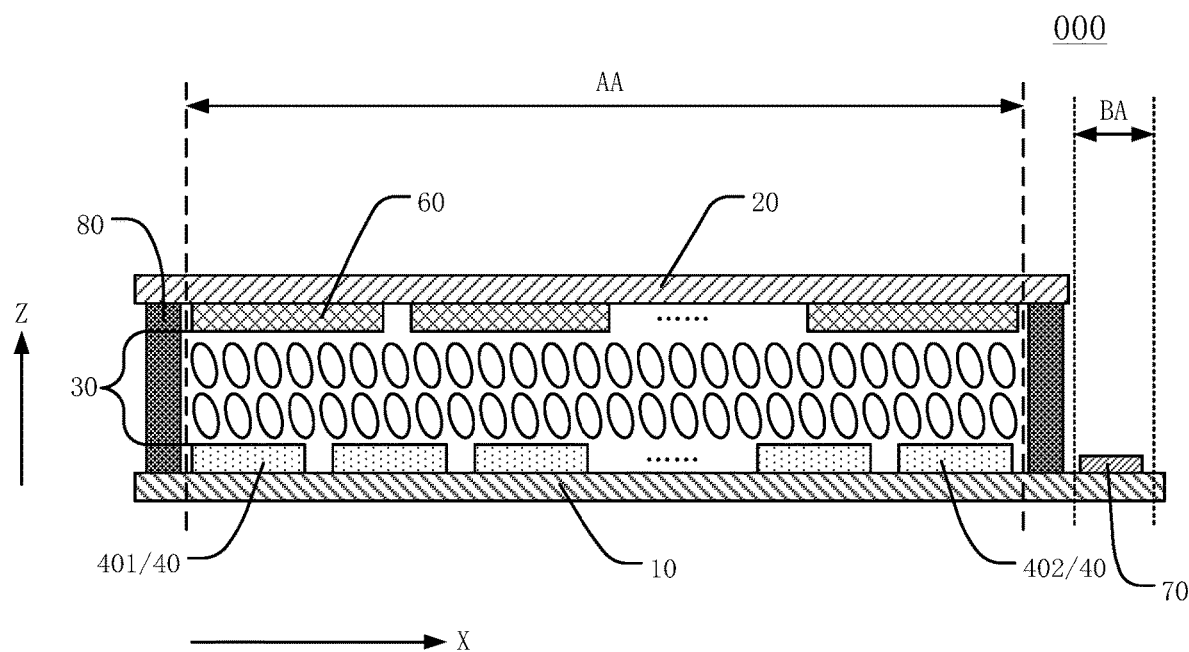
FIG. 3 illustrates a schematic diagram of another exemplary liquid crystal antenna consistent with disclosed embodiments of the present disclosure.
Figure 4:
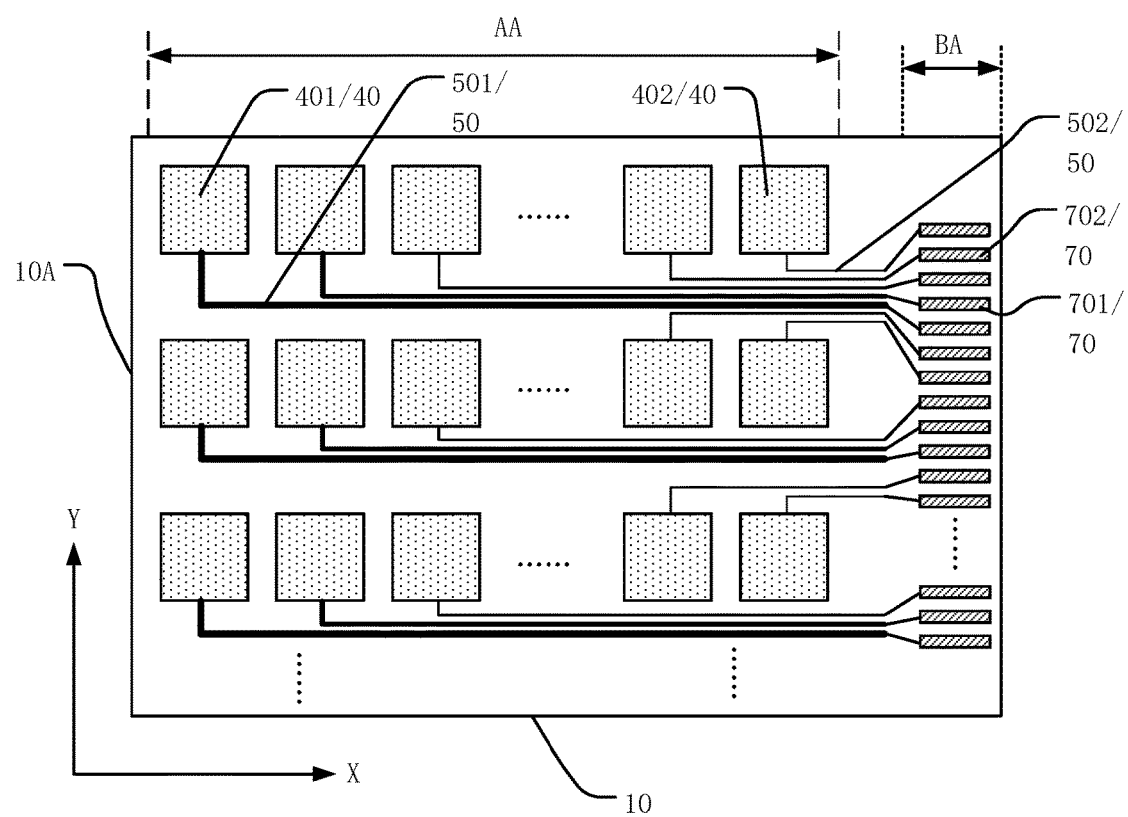
FIG. 4 illustrates a schematic top view of a side of an exemplary first substrate facing toward a second substrate in FIG. 3 consistent with disclosed embodiments of the present disclosure.

FIG. 3 illustrates a schematic diagram of another liquid crystal antenna consistent with disclosed embodiments of the present disclosure; and FIG. 4 illustrates a schematic top view of a side of a first substrate facing toward a second substrate in FIG. 3. To clearly illustrate the structure of the liquid crystal antenna, the first substrate in FIG. 4 may not be filled. In certain embodiments, referring to FIG. 3 and FIG. 4, along the first direction X, the transmission electrode 40 may not be disposed between the second transmission electrode 402 and the binding region BA, and the transmission electrode 40 may not be disposed between the first transmission electrode 401 and a first edge 10A. The first edge 10A may be an edge of the first substrate 10 away from the binding region BA.

The present disclosure may explain that in the first direction X, the distance between the first transmission electrode 401 and the binding region BA may be different from the distance between the second transmission electrode 402 and the binding region BA. The first transmission electrode 401 may be a transmission electrode farthest to the binding region BA, and the second transmission electrode 402 may be a transmission electrode closest to the binding region BA. In other words, along the first direction X, there may be no any other transmission electrode 40 between the second transmission electrode 402 and the binding region BA. There may be a gap or space between the second transmission electrode 402 and the binding region BA, or any other structure of the liquid crystal antenna 000 may be disposed between the second transmission electrode 402 and the binding region BA. There may be a gap or space between the first transmission electrode 401 and the first edge 10A on the side of the first substrate 10 away from the binding region BA, or any other structure of the liquid crystal antenna 000 may be disposed between the first transmission electrode 401 and the first edge 10A. However, there may be no any other transmission electrode 40 between the first transmission electrode 401 and the first edge 10A on the side of the first substrate 10 away from the binding region BA.

In the present disclosure, in the first direction X, a ratio of the resistance A of the first signal line 501 connected to the first transmission electrode 401 farthest from the binding region BA over the resistance B of the second signal line 502 connected to the second transmission electrode 402 closest to the binding region BA may be less than 10. Therefore, the resistance difference between different signal lines 50 connected to the transmission electrode 40 at the farthest end and the transmission electrode 40 at the nearest end may be further reduced, which may effectively balance the resistance difference between the signal lines 50 connected to the transmission electrodes 40 at different positions, and may enable the phase of each transmission electrode 40 to be synchronously outputted as much as possible. Thus, the phase control of the liquid crystal antenna 000 may be substantially accurate, which may facilitate to effectively improve the gain of the liquid crystal antenna and the phase accuracy of entire liquid crystal antenna.

Optionally, if the manufacturing process permits, the resistance A of the first signal line 501 may be equal to the resistance B of the second signal line 502, such that the resistance of the signal lines 50 connected to the transmission electrodes 40 at different positions on the first substrate 10 may be kept consistent, which may effectively improve the gain of the liquid crystal antenna and the phase accuracy of entire liquid crystal antenna.

Figure 5:
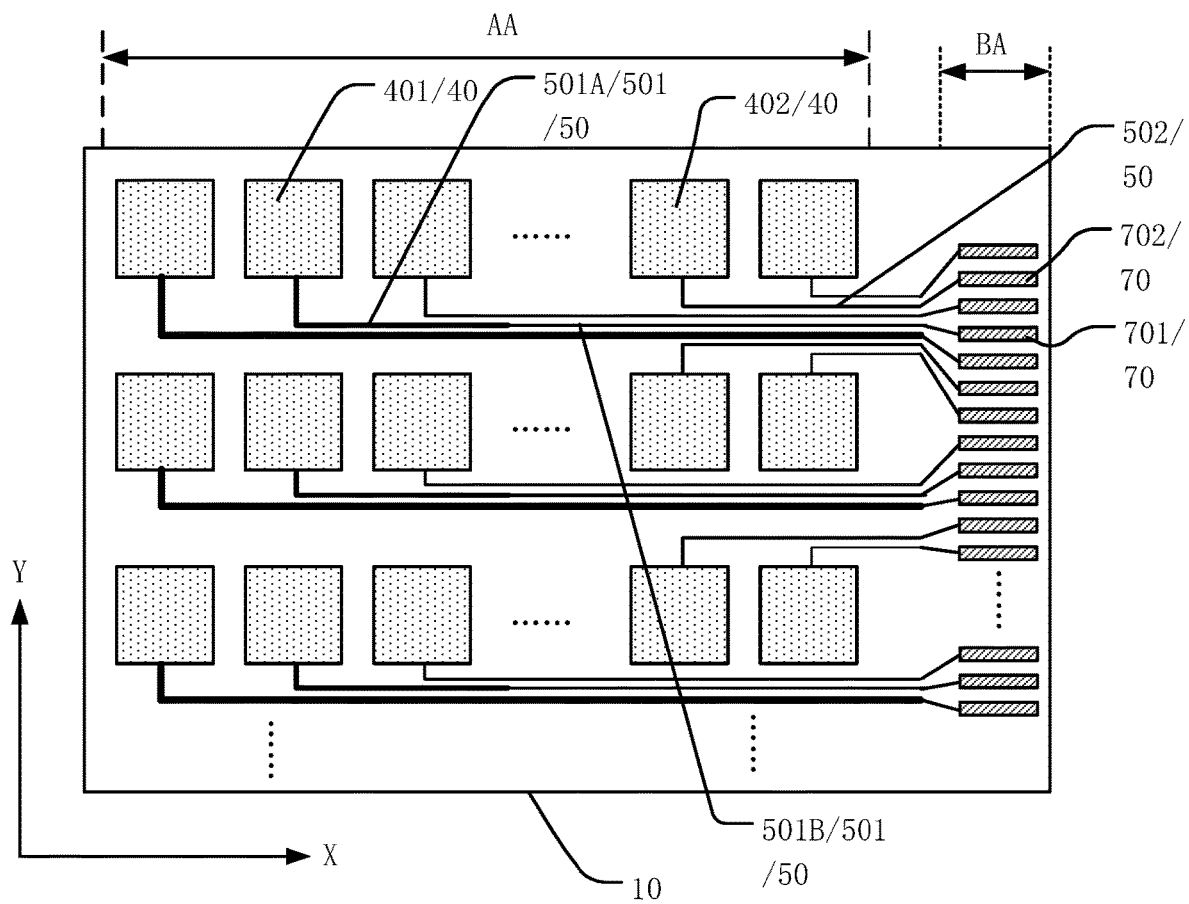
FIG. 5 illustrates a schematic top view of a side of another exemplary first substrate facing toward a second substrate in FIG. 1 consistent with disclosed embodiments of the present disclosure.
Figure 6:
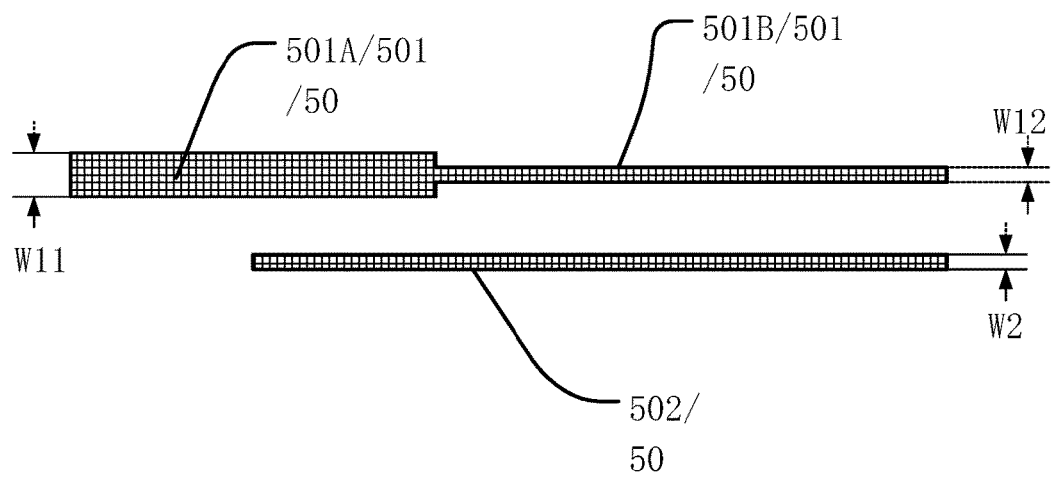
FIG. 6 illustrates a comparison diagram of individual widths of a first signal line and a second signal line in FIG. 5 consistent with disclosed embodiments of the present disclosure.

FIG. 5 illustrates a schematic top view of a side of another first substrate facing toward the second substrate in FIG. 1; and FIG. 6 illustrates a comparison diagram of individual widths of the first signal line and the second signal line in FIG. 5. For illustrative purposes, to clearly illustrate the structure of the liquid crystal antenna, the first substrate in FIG. 5 may not be filled. FIG. 6 merely illustrates a width comparison of the first signal line and the second signal line, which may not indicate the actual ratio of a first sub-segment over a second sub-segment in the first signal line, and may not indicate the actual lengths of the first signal line and the second signal line. In certain embodiments, referring to FIG. 1, FIG. 5 and FIG. 6, the first signal line 501 may include at least one first sub-segment 501A and at least one second sub-segment 501B. In a direction parallel to the plane of the first substrate 10, along a direction perpendicular to an extension direction of the first signal line 501, a width W11 of the first sub-segment 501A may be greater than a width W12 of the second sub-segment 501B.

The present disclosure may explain that in the first direction X, the first signal line 501 connected to the first transmission electrode 401 at the far end of the binding region BA may include a plurality of sub-segment structures with different widths. In one embodiment, the first signal line 501 may include at least one first sub-segment 501A and at least one second sub-segment 501B. In a direction parallel to the plane of the first substrate 10, along the direction perpendicular to the extension direction of the first signal line 501, the width W11 of the first sub-segment 501A may be greater than the width W12 of the second sub-segment 501B. Optionally, the first signal line 501 and the second signal line 502 may be made of a same material. Along the direction Z perpendicular to the plane of the first substrate 10, the thickness of the first signal line 501 may be equal to the thickness of the second signal line 502 (not illustrated), which may facilitate to improve the process efficiency.

In one embodiment, the first signal line 501 may include the first sub-segment 501A and the second sub-segment 501B with different widths, to reduce the resistance of the first signal line 501 with a substantially large length. Therefore, the resistances of the first signal line 501 and the second signal line 502 respectively connected to the first transmission electrode 401 and the second transmission electrode 402 that have different distances from the binding region BA may be consistent as much as possible. Therefore, the phase of each transmission electrode 40 may be synchronously outputted as much as possible, and the phase control of the liquid crystal antenna 000 may be substantially accurate, which may facilitate to effectively improve the gain of the liquid crystal antenna and the phase accuracy of entire liquid crystal antenna.

Optionally, referring to FIG. 6, the width W2 of the second signal line 502 may be equal to the width W12 of the second sub-segment 501B.

The present disclosure may further explain that when the first signal line 501 includes the first sub-segment 501A and the second sub-segment 501B with different widths, the width W12 of the second sub-segment 501B with a substantially narrow width may be set to be equal to or almost equal to the width W2 of the second signal line 502. Because along the first direction X, the distance between the first transmission electrode 401 and the binding region BA may be different from the distance between the second transmission electrode 402 and the binding region BA, the length of the first signal line 501 may be different form the length of the second signal line 502, the resistance of the first signal line 501 may be different from the resistance of the second signal line 502, and the signal transmission effects may be different.

For example, under the same other conditions, the first signal line 501 may have a larger length, and, thus, may have a larger resistance, the second signal line 502 may have a smaller length, and, thus, may have a smaller resistance. Therefore, to reduce the resistance difference between the first signal line 501 and the second signal line 502, the width of the first signal line 501 connected to the first transmission electrode 401 at the far end may increase to reduce the overall resistance of the first signal line 501, and, thus, the resistance difference between the signal lines 50 with different lengths may be reduced.

Therefore, in one embodiment, the width W12 of the second sub-segment 501B with a substantially narrow width in the first signal line 501 may be equal to or almost equal to the width W2 of the second signal line 502, and width W11 of the first sub-segment 501A of the first signal line 501 may be greater than the width W2 of the second signal line 502, such that the overall resistance of the first signal line 501 may be reduced. Therefore, the resistances of the first signal line 501 and the second signal line 502 respectively connected to the first transmission electrode 401 and the second transmission electrode 402 that have different distances from the binding region BA may be consistent as much as possible, which may facilitate to effectively improve the gain of the liquid crystal antenna and the phase accuracy of entire liquid crystal antenna. In the present disclosure, merely the configuration of the first signal line 501 connected to the first transmission electrode 401 at the far end may need to be changed, and the manufacturing process may be convenient.

It should be noted that FIG. 5 and FIG. 6 merely illustrate the width relationship between one first signal line 501 and one second signal line 502, which may not mean that there are merely these two signal lines 50 having the above-mentioned width relationship in the entire liquid crystal antenna 000. In specific implementation, along the first direction X, any two signal lines 50 with different lengths connected to the transmission electrodes 40 having different distances from the binding region BA may be set to have the above-mentioned width relationship, to balance the resistance difference between the two signal lines 50, which may not be repeated herein.

Figure 7:
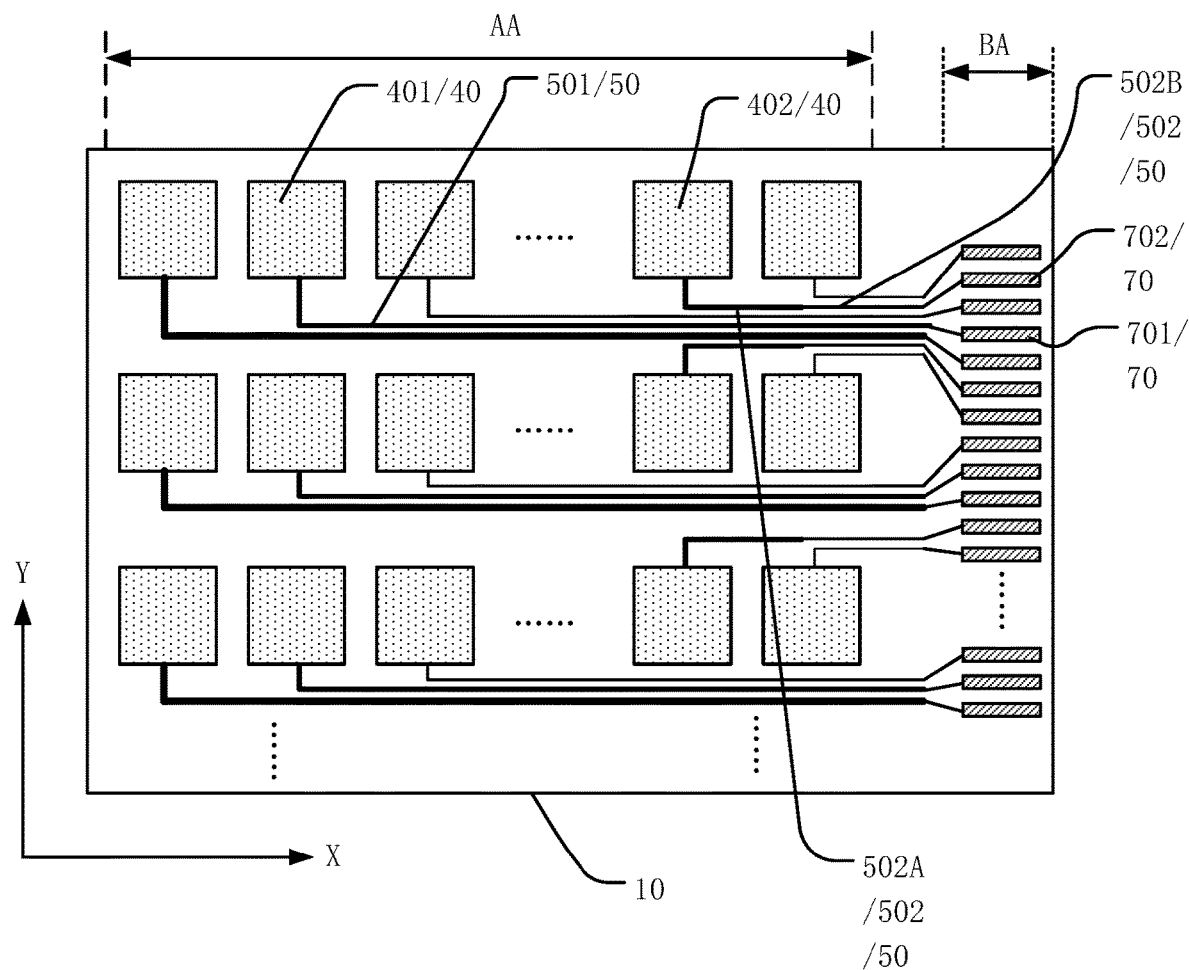
FIG. 7 illustrates a schematic top view of a side of another exemplary first substrate facing toward a second substrate in FIG. 1 consistent with disclosed embodiments of the present disclosure.
Figure 8:
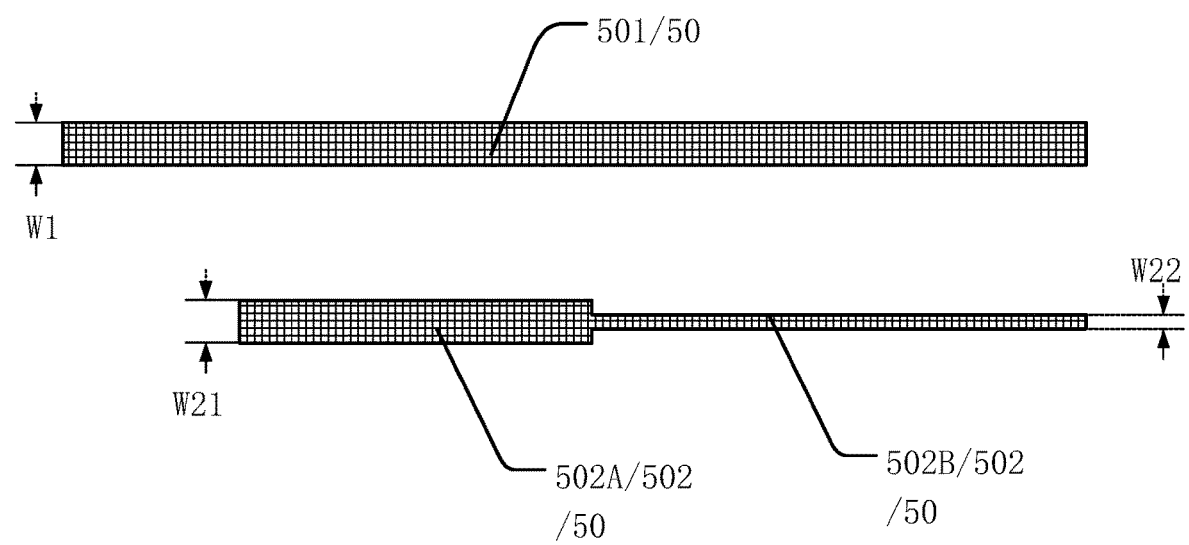
FIG. 8 illustrates a comparison diagram of individual widths of a first signal line and a second signal line in FIG. 7 consistent with disclosed embodiments of the present disclosure.

FIG. 7 illustrates a schematic top view of a side of another first substrate facing toward the second substrate in FIG. 1; and FIG. 8 illustrates a comparison diagram of individual widths of the first signal line and the second signal line in FIG. 7. For illustrative purposes, to clearly illustrate the structure of the liquid crystal antenna, the first substrate in FIG. 7 may not be filled. FIG. 8 merely illustrates a width comparison of the first signal line and the second signal line, which may not indicate the actual ratio of a first sub-segment over a second sub-segment in the first signal line, and may not indicate the actual lengths of the first signal line and the second signal line.

In certain embodiments, referring to FIG. 1, FIG. 7 and FIG. 8, the second signal line 502 may include a plurality of sub-segment structures with different widths. For example, the second signal line 502 may include a ninth sub-segment 502A and a tenth sub-segment 502B. A width W21 of the ninth sub-segment 502A may be greater than a width W22 of the tenth sub-segment 502B, and an overall width W1 of the first signal line 501 may be kept consistent. The overall width W1 of the first signal line 501 may be equal to or almost equal to the width W21 of the ninth sub-segment 502A with a larger width in the second signal line 502. In other words, the width of the second signal line 502 connected to the second transmission electrode 402 at the near end may be reduced to increase the overall resistance of the second signal line 502, which may reduce the resistance difference between the first signal line 501 and the second signal line 502, and may improve the gain of the liquid crystal antenna and phase accuracy of the entire liquid crystal antenna.

It should be noted that FIG. 7 and FIG. 8 merely illustrate the width relationship between one first signal line 501 and one second signal line 502, which may not mean that there are merely these two signal lines 50 having the above-mentioned width relationship in the entire liquid crystal antenna 000. In specific implementation, along the first direction X, any two signal lines 50 with different lengths connected to the transmission electrodes 40 having different distances from the binding region BA may be set to have the above-mentioned width relationship, to balance the resistance difference between the two signal lines 50, which may not be repeated herein.

It should be explained that in one embodiment, the quantity of the first sub-segments 501A and the second sub-segments 501B in the first signal line 501, and the quantity of the ninth sub-segments 502A and the tenth sub-segments 502B in the second signal line 502 may not be specifically limited. Referring to FIG. 5, the first signal line 501 may merely include one first sub-segment 501A and one second sub-segment 501B. Referring to FIG. 7, the second signal line 502 may merely include one ninth sub-segment 502A and one tenth sub-segment 502B. In certain embodiments, the first signal line and the second signal line may also include any other quantity of sub-segments, which may not be specifically limited by the present disclosure, and may be determined according to actual needs in specific implementation.

Figure 9:
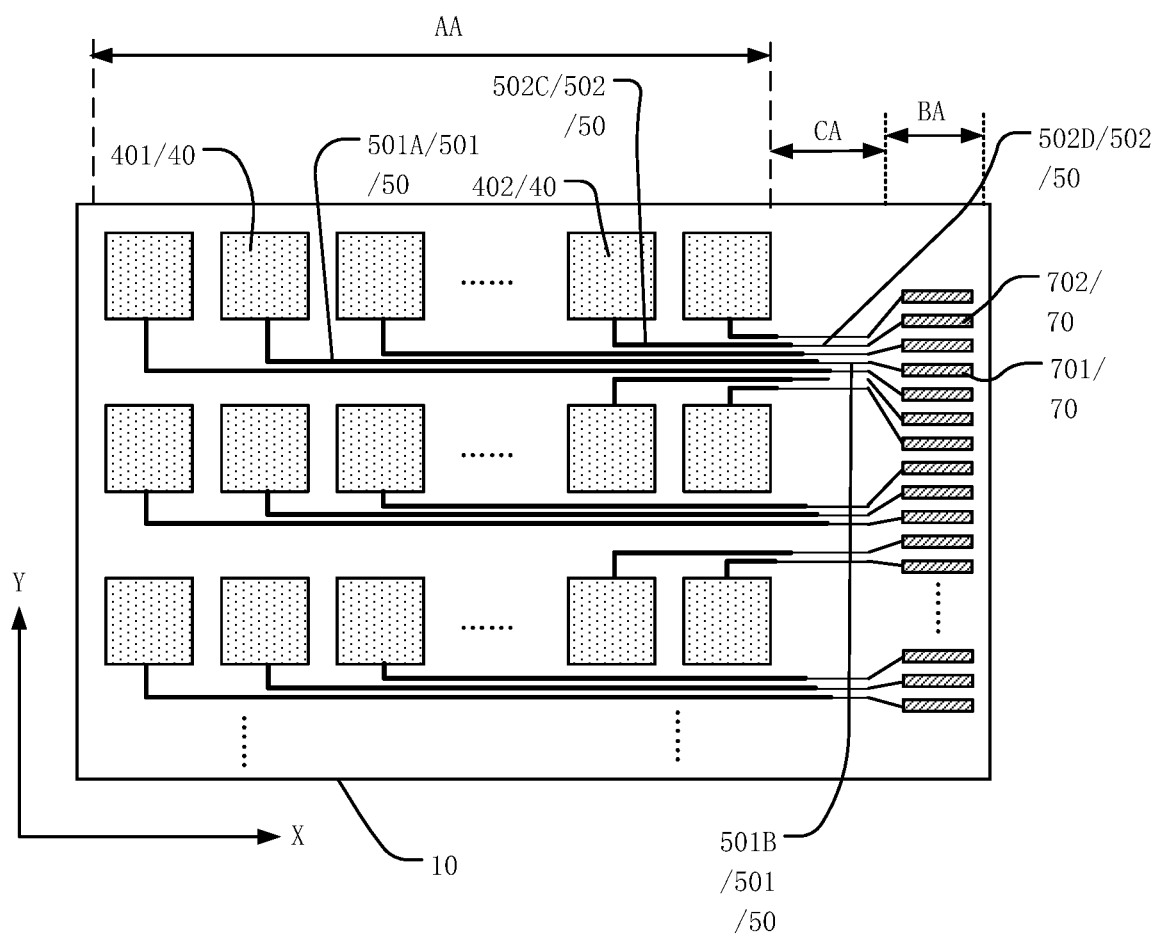
FIG. 9 illustrates a schematic top view of a side of another exemplary first substrate facing toward a second substrate in FIG. 1 consistent with disclosed embodiments of the present disclosure.
Figure 10:
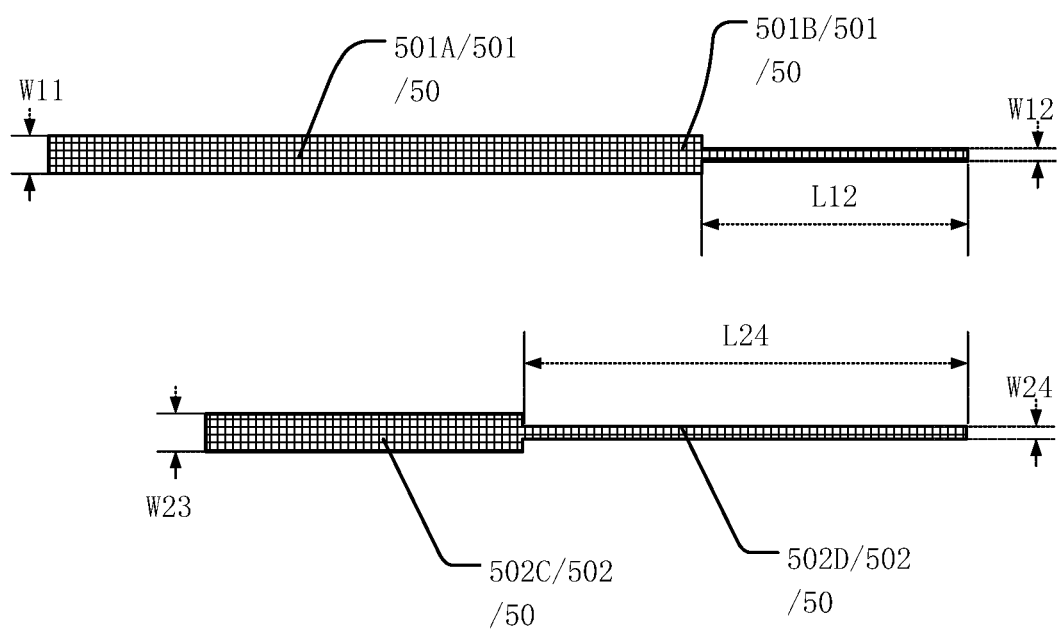
FIG. 10 illustrates a comparison diagram of individual widths of a first signal line and a second signal line in FIG. 9 consistent with disclosed embodiments of the present disclosure.

FIG. 9 illustrates a schematic top view of a side of another first substrate facing toward the second substrate in FIG. 1; and FIG. 10 illustrates a comparison diagram of individual widths of the first signal line and the second signal line in FIG. 9. For illustrative purposes, to clearly illustrate the structure of the liquid crystal antenna, the first substrate in FIG. 9 may not be filled. FIG. 10 merely illustrates a width comparison of the first signal line and the second signal line and lengths of sub-segments, which may not indicate the actual ratio of a first sub-segment over a second sub-segment in the first signal line, and may not indicate the actual lengths of the first signal line and the second signal line.

In certain embodiments, referring to FIG. 1, FIG. 9 and FIG. 10, the first signal line 501 may include at least one first sub-segment 501A and at least one second sub-segment 501B. In the direction parallel to the plane of the first substrate 10, along the direction perpendicular to the extension direction of the first signal line 501, the width W11 of the first sub-segment 501A may be greater than the width W12 of the second sub-segment 501B. The second signal line 502 may include at least one third sub-segment 502C and at least one fourth sub-segment 502D. A width W23 of the third sub-segment 502C may be greater than a width W24 of the fourth sub-segment 502D, the width W23 of the third sub-segment 502C may be equal to the width W11 of the first sub-segment 501A, and the width W24 of the fourth sub-segment 502D may be equal to the width W12 of the second sub-segment 501B. A length L24 of the fourth sub-segment 502D may be greater than a length L12 of the second sub-segment 501B.

The present disclosure may further explain that along the first direction X, any two signal lines 50 with different lengths connected to the transmission electrodes 40 with different distances from the binding region BA may have a structure including sub-segments of different widths. For example, the first signal line 501 connected to the first transmission electrode 401 at the far end may include at least one first sub-segment 501A and at least one second sub-segment 501B. In a direction parallel to the plane of the first substrate 10, along a direction perpendicular to an extension direction of the first signal line 501, the width W11 of the first sub-segment 501A may be greater than the width W12 of the second sub-segment 501B. The second signal line 502 connected to the second transmission electrode 402 at the near end may include at least one third sub-segment 502C and at least one fourth sub-segment 502D. The width W23 of the third sub-segment 502C may be greater than the width W24 of the fourth sub-segment 502D, the width W23 of the third sub-segment 502C may be equal to the width W11 of the first sub-segment 501A, and the width W24 of the fourth sub-segment 502D may be equal to the width W12 of the second sub-segment 501B. Thus, the resistance difference between the two signal lines 50 with different lengths may be adjusted substantially flexibly.

In addition, in one embodiment, the length L24 of the fourth sub-segment 502D with a narrower width in the second signal line 502 may be greater than the length L12 of the second sub-segment 501B with a narrower width in the first signal line 501.

In other words, compared with the second signal line 502 connected to the second transmission electrode 402 at the near end, the sub-segment with a wider width in the first signal line 501 connected to the transmission electrode 401 at the far end may have a length greater than the sub-segment with a wider width in the second signal line 502. Therefore, by increasing the width of the first signal line 501 with a larger length, the overall resistance of the first signal line 501 may be reduced, thereby making the resistance of the first signal line 501 be consistent with the resistance of the second signal line 502 with a smaller length. Further, the resistance difference between the first signal line 501 and the second signal line 502 may be reduced, which may improve the gain of the liquid crystal antenna and the phase accuracy of the entire liquid crystal antenna.

In certain embodiments, referring to FIG. 1 and FIG. 9, the liquid crystal antenna may include a second region CA between the first region AA and the binding region BA along the first direction X. The first sub-segment 501A and the third sub-segment 502C may be located in the first region AA, and the second sub-segment 501B and the fourth sub-segment 502D may be located in the second region CA.

The present disclosure may explain that along the first direction X, when any two signal lines 50 with different lengths connected to the transmission electrodes 40 with different distances from the binding region BA include the structure including sub-segments of different widths, the sub-segments with a same width may be disposed in a same region along the first direction X. The first signal line 501 may include at least one first sub-segment 501A and at least one second sub-segment 501B. The width W11 of the first sub-segment 501A may be greater than the width W12 of the second sub-segment 501B. The second signal line 502 may include at least one third sub-segment 502C and at least one fourth sub-segment 502D. The width W23 of the third sub-segment 502C may be greater than the width W24 of the fourth sub-segment 502D, the width W23 of the third sub-segment 502C may be equal to the width W11 of the first sub-segment 501A, and the width W24 of the fourth sub-segment 502D may be equal to the width W12 of the second sub-segment 501B.

Therefore, the third sub-segment 502C and the first sub-segment 501A having a same width may be disposed in the first region AA of the liquid crystal antenna 000. The second sub-segment 501B and the fourth sub-segment 502D having a same width may be disposed in the second region CA of the liquid crystal antenna 000. Thus, the signal lines 50 in the first region AA may include sub-segments with a substantially large width, and the signal lines 50 in the second region CA may include sub-segments with a substantially small width. Because in the manufacturing process, the signal lines 50 is often made of a metal layer formed by one-time photolithography, through disposing the signal lines with a same or similar width in one region, the line width may be conveniently monitored, which may facilitate to improve the production accuracy of sub-segments with different widths, and to reduce the resistance difference between the first signal line 501 and the second signal line 502.

Figure 11:
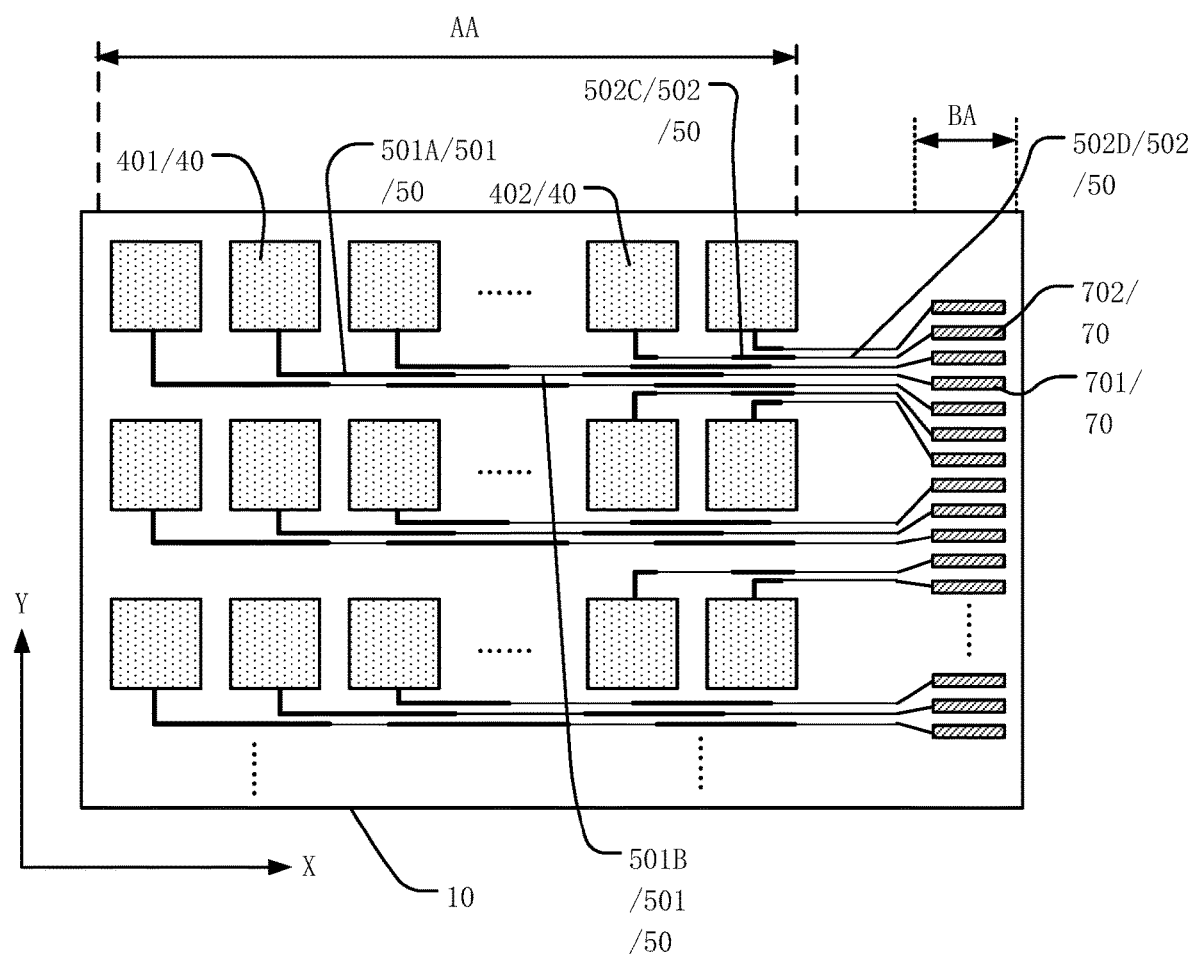
FIG. 11 illustrates a schematic top view of a side of another exemplary first substrate facing toward a second substrate in FIG. 1 consistent with disclosed embodiments of the present disclosure.

FIG. 11 illustrates a schematic top view of a side of another first substrate facing toward the second substrate in FIG. 1. To clearly illustrate the structure of the liquid crystal antenna, the first substrate in FIG. 11 may not be filled. In certain embodiments, referring to FIG. 1 and FIG. 11, the first sub-segments 501A and the second sub-segments 501B may be alternately connected in sequence, and the third sub-segments 502C and the fourth sub-segments 502D may be alternately connected in sequence.

The present disclosure may further explain that along the first direction X, any two signal lines 50 with different lengths connected to the transmission electrodes 40 with different distances from the binding region BA may include the structure including sub-segments of different widths. The first signal line 501 may include a plurality of first sub-segments 501A and a plurality of second sub-segments 501B. The width W11 of the first sub-segment 501A may be greater than the width W12 of the second sub-segment 501B. The plurality of first sub-segments 501A and the plurality of second sub-segments 501B may be alternately connected in sequence. The second signal line 502 may include a plurality of third sub-segments 502C and a plurality of fourth sub-segments 502D. The width W23 of the third sub-segment 502C may be greater than the width W24 of the fourth sub-segment 502D. The plurality of third sub-segments 502C and the plurality of fourth sub-segments 502D may be alternately connected in sequence. The width W23 of the third sub-segment 502C may be equal to the width W11 of the first sub-segment 501A, and the width W24 of the fourth sub-segment 502D may be equal to the width W12 of the second sub-segment 501B.

In one embodiment, the sub-segments with a small width of each signal line 50 may be dispersedly disposed at different positions of the signal line 50. The same signal line 50 may include one wide segment, one narrow segment, one wide segment, one narrow segment, and so on. The structure of the signal line may not be limited to the structure with merely one narrow segment and one wide segment, and may be determined according to the actual space size at each position in the specific implementation, as long as the resistance difference between the first signal line 501 and the second signal line 502 is capable of being reduced through the different design of the widths of sub-segments.

It should be noted that the quantities and specific lengths of the first sub-segments 501A and the second sub-segments 501B that are alternately connected in sequence in the first signal line 501 may not be limited by the present disclosure, and the quantities and specific lengths of the third sub-segments 502C and fourth sub-segments 502D that are alternately connected in sequence in the second signal line 502 may not be limited by the present disclosure, as long as the resistance difference between the first signal line 501 and the second signal line 502 is capable of being reduced.

Figure 12:
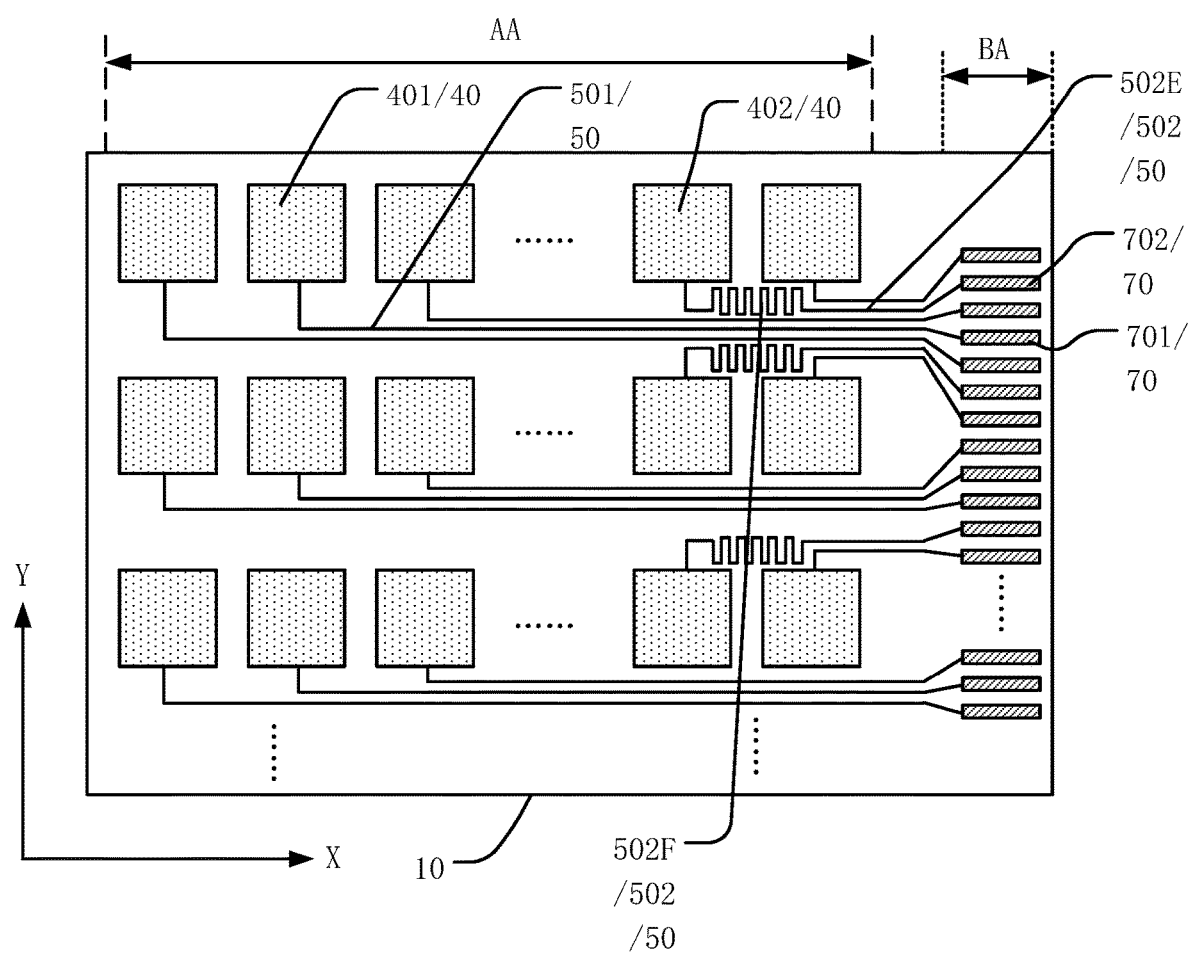
FIG. 12 illustrates a schematic top view of a side of another exemplary first substrate facing toward a second substrate in FIG. 1 consistent with disclosed embodiments of the present disclosure.
Figure 13:
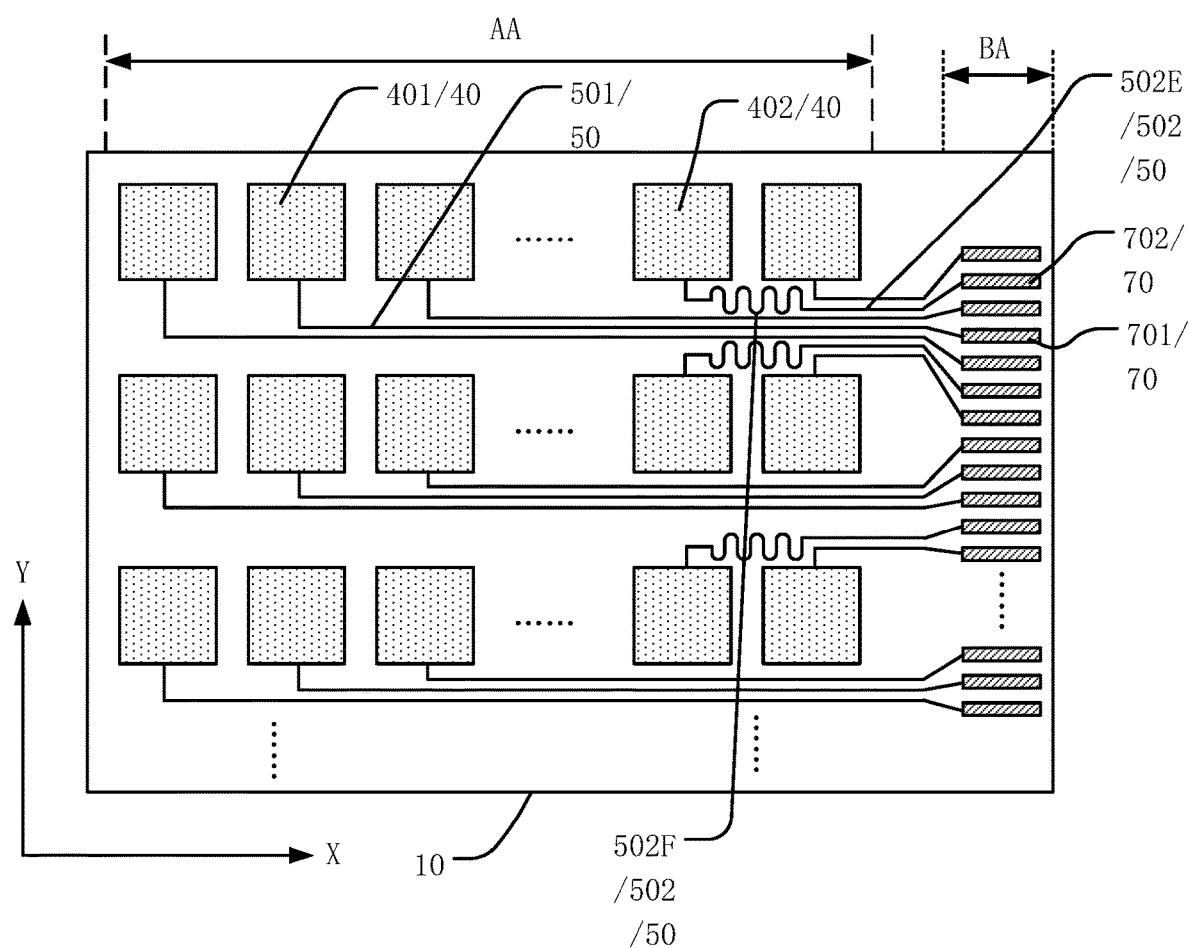
FIG. 13 illustrates a schematic top view of a side of another exemplary first substrate facing toward a second substrate in FIG. 1 consistent with disclosed embodiments of the present disclosure.

FIG. 12 illustrates a schematic top view of a side of another first substrate facing toward the second substrate in FIG. 1; and FIG. 13 illustrates a schematic top view of a side of another first substrate facing toward the second substrate in FIG. 1. For illustrative purposes, to clearly illustrate the structure of the liquid crystal antenna, the first substrates in FIG. 12 and FIG. 13 may not be filled. FIG. 12 and FIG. 13 merely illustrate that the second signal line may include a fifth sub-segment and a sixth sub-segment, may not indicate the actual ratio of the fifth sub-segment over the sixth sub-segment in the second signal line, and may not indicate the actual lengths of the fifth signal line and the sixth signal line. In certain embodiments, referring to FIG. 1, FIG. 12 and FIG. 13, the length of the first signal line 501 may be equal to the length of the second signal line 502.

In one embodiment, to reduce the resistance difference between different signal lines 50 connected to the transmission electrodes 40 with different distances from the binding region BA, the length of the first signal line 501 may be equal to the length of the second signal line 502. In other words, the length of the first signal line 501 connected to the first transmission electrode 401 at the far end may be equal to or almost equal to the length of the second signal line 502 connected to the second transmission electrode 402 at the near end, such that the resistance of the first signal line 501 may be close to and consistent with the resistance of the second signal line 502, to reduce the resistance difference between the first signal line 501 and the second signal line 502, and to improve the gain of the liquid crystal antenna and the phase accuracy of the entire liquid crystal antenna.

Optionally, referring to FIG. 12 and FIG. 13, by increasing the length of the second signal line 502 connected to the second transmission electrode 402 at the near end, the length of the first signal line 501 may be equal to or almost equal to the length of the second signal line 502. The first signal line 501 and the second signal line 502 may be made of a same material. Along the direction Z perpendicular to the plane of the first substrate 10, the thickness of the first signal line 501 may be equal to the thickness of the second signal line 502 (not shown in the Figure), which may facilitate to improve the process efficiency.

In one embodiment, most of the first signal line 501 may still have a straight line structure, while the originally short second signal line 502 may include a fifth sub-segment 502E and a sixth sub-segment 502F. The fifth sub-segment 502E may have a straight line structure, and the sixth sub-segment 502F may have a polyline structure or a curved structure. Therefore, the overall length of the second signal line 502 may increase through the sixth sub-segment 502F with the polyline structure or the curved structure, such that the length of the first signal line 501 may be equal to or almost equal to the length of the second signal line 502, and the resistance difference between the first signal line 501 and the second signal line 502 may be reduced.

Optionally, referring to FIG. 12, the sixth sub-segment 502F of the second signal line 502 may have a polyline-shaped serpentine structure. Referring to FIG. 13, the sixth sub-segment 502F of the second signal line 502 may have a curve-shaped winding structure, which may further reduce the possibility of being bent and broken of the sixth sub-segment 502F of the second signal line 502, and may facilitate to improve the manufacturing yield.

It should be noted that FIG. 12 and FIG. 13 merely illustrate one first signal line 501 with an overall straight line structure and one second signal line 502 including the fifth sub-segment 502E and the sixth sub-segment 502F, which may not mean that merely the one second signal line 502 has the above structure in the entire liquid crystal antenna 000. In specific implementation, along the first direction X, any signal line 50 connected to the transmission electrode 40 may have the above-mentioned structure including the fifth sub-segment 502E with the straight line structure and the sixth sub-segment 502F with the polyline/curved structure, to balance the resistance difference between any two signal lines 50.

Figure 14:
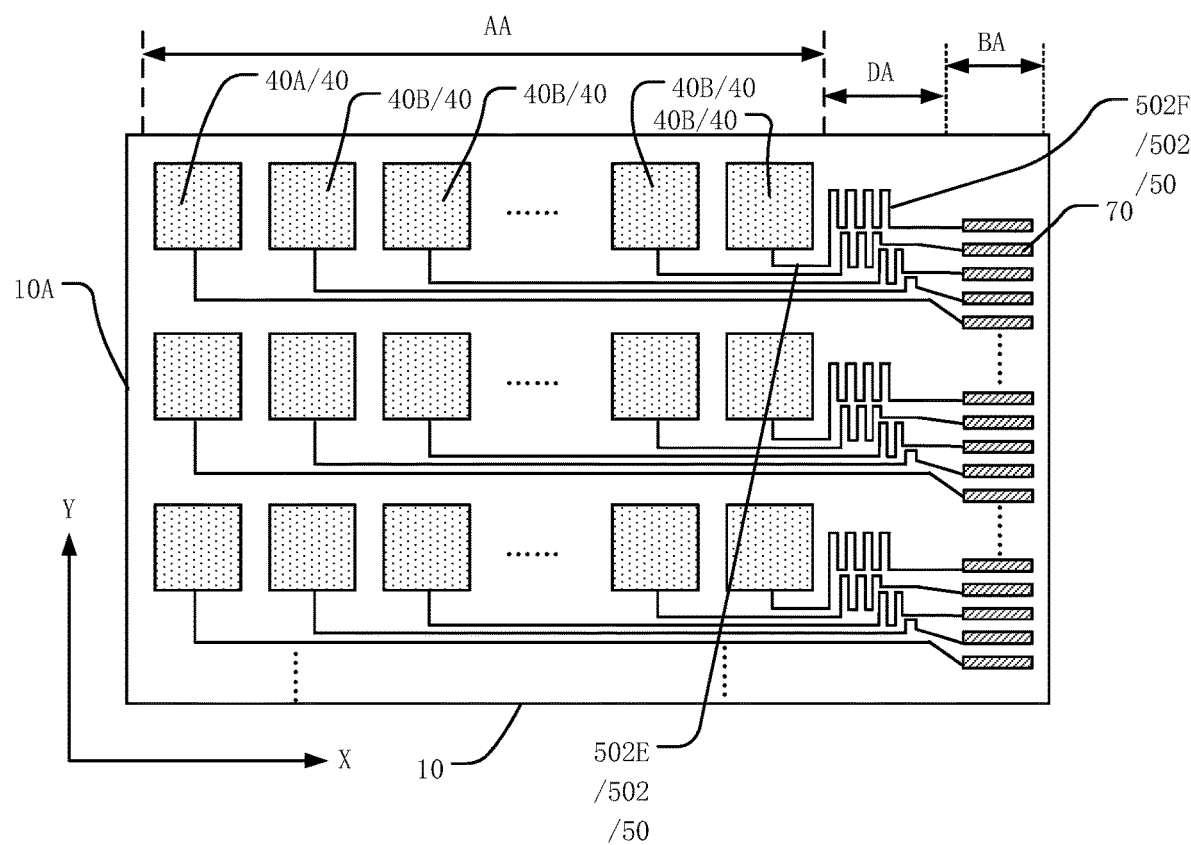
FIG. 14 illustrates a schematic top view of a side of another exemplary first substrate facing toward a second substrate in FIG. 1 consistent with disclosed embodiments of the present disclosure.

FIG. 14 illustrates a schematic top view of a side of another first substrate facing toward the second substrate in FIG. 1. Optionally, referring to FIG. 14, among the plurality of transmission electrodes 40 sequentially arranged along the first direction X, merely the signal line 50 connected to the first-type transmission electrode 40A closest to the first edge 10A (the first edge 10A may be the edge on the side of the first substrate 10 away from the binding region BA) may have an overall straight line structure, and may merely be bent when transmission direction needs to be changed. The plurality of signal lines 50 connected to the remaining multiple second-type transmission electrodes 40B may include the fifth sub-segment 502E with the straight line structure and the sixth sub-segment 502F with the polyline/curved structure. Optionally, each signal line 50 may be made of a same material. Along the direction Z perpendicular to the plane of the first substrate 10, each signal line may have a same thickness (not shown in the Figure), which may facilitate to improve the process efficiency.

The difference between the plurality of signal lines 50 connected to the multiple second-type transmission electrodes 40B may include that the quantity of the sixth sub-segments 502F with the polyline/curved structure in the signal line 50 connected to the second-type transmission electrode 40B close to the first-type transmission electrode 40A may be less than the quantity of the sixth sub-segments 502F with the polyline/curved structure in the signal line 50 connected to the second-type transmission electrode 40B farther from the first-type transmission electrode 40A. Therefore, different signal lines 50 connected to the multiple transmission electrodes 40 in the first direction X may have a same or similar length, to balance the resistance difference between the signal lines 50 connected to all the transmission electrodes 40 in the liquid crystal antenna 000, which may further improve the gain of the liquid crystal antenna and the phase accuracy of the overall liquid crystal antenna.

In certain embodiments, referring to FIG. 1 and FIG. 14, along the first direction X, the liquid crystal antenna 000 may include a third region DA between the first region AA and the binding region BA. The fifth sub-segment 502E may be located in the first region AA, and the sixth sub-segment 502F may be located in the third region DA.

In the present disclosure, along the first direction X, among any two different signal lines 50 connected to the transmission electrodes 40 with different distances from the binding region BA, the sixth sub-segment 502F with the polyline/curved structure may be provided on the originally short signal line 50, such that the original two signal lines 50 with different lengths may have a same or similar length, to balance the resistance difference between the signal lines 50 connected to all the transmission electrodes 40 in the liquid crystal antenna 000.

In view of this, the sixth sub-segment 502F with the polyline/curved structure of each signal line 50 may be located in the third region DA of the liquid crystal antenna 000, and the remaining fifth sub-segment 502E with an overall straight line structure of the signal line 50 may be located in the first region AA of the liquid crystal antenna 000. Therefore, the signal lines 50 in the first region AA may almost have the straight line structure, and the signal lines 50 in the third region DA may have the specially designed polyline/curved structure. Thus, the sixth sub-segment 502F with the polyline/curved structure may be prevented from being disposed in the first region AA where the transmission electrodes 40 are located, and may be prevented from occupying too much space in the first region AA to affect the quantity of transmission electrodes 40. Because in the manufacturing process, the signal line 50 is often made of a metal layer formed by one-time photolithography, through disposing the signal lines with a same or similar shaped structure in one region, the manufacturing may be conveniently monitored, which may facilitate to improve the production accuracy of signal lines having different shapes in different regions, and to further reduce the resistance difference between the first signal line 501 and the second signal line 502.

Figure 15:
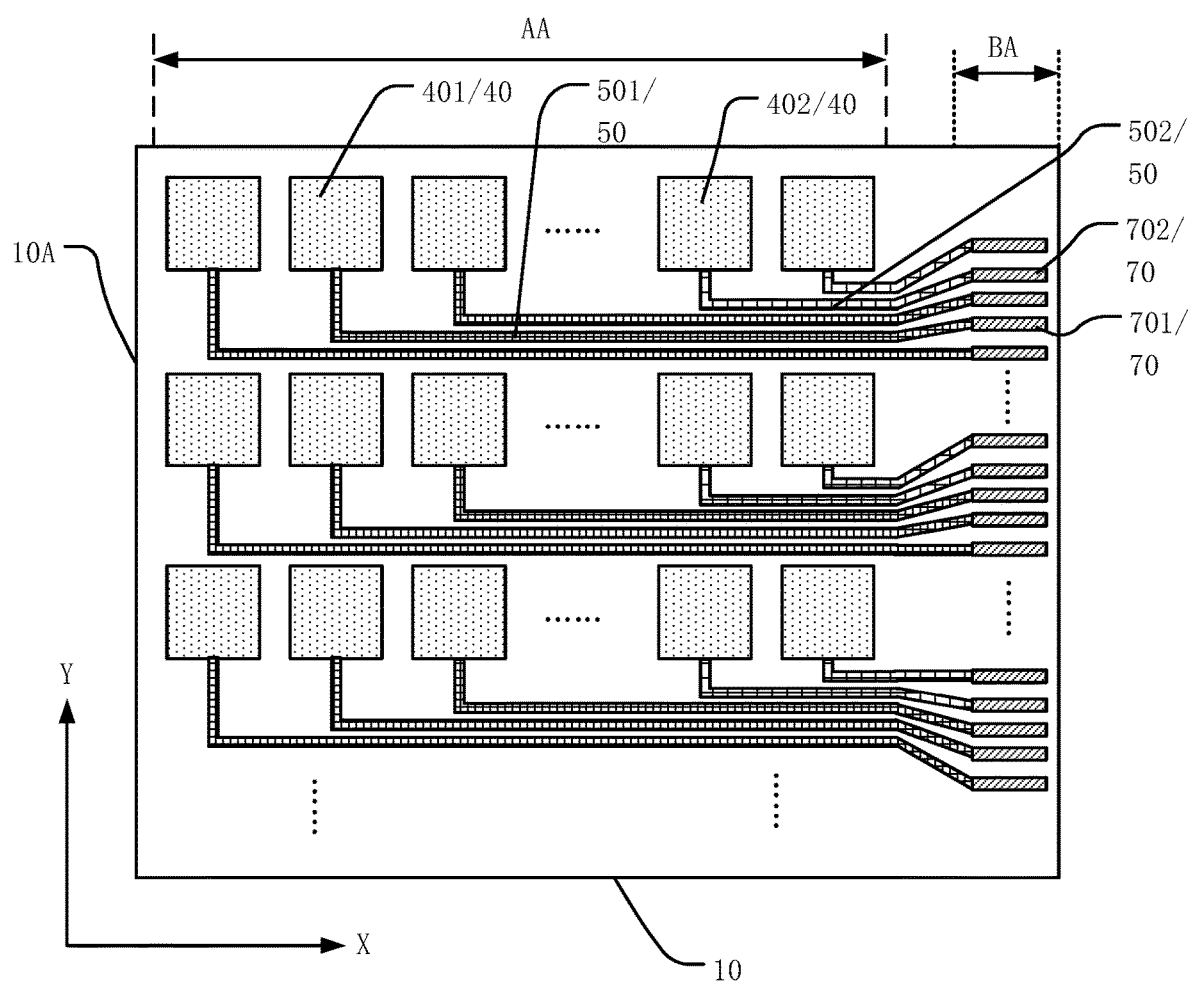
FIG. 15 illustrates a schematic top view of a side of another exemplary first substrate facing toward a second substrate in FIG. 1 consistent with disclosed embodiments of the present disclosure.

FIG. 15 illustrates a schematic top view of a side of another first substrate facing toward the second substrate in FIG. 1. In certain embodiments, referring to FIG. 1 and FIG. 15, the first signal line 501 may be made of a material including a first material, and the second signal line 502 may be made of a material including a second material. The first material may have a resistivity smaller than the second material. FIG. 15 may use different fillings to indicate that the first signal line and the second signal line are made of different materials.

In one embodiment, in the first direction X, among any two different signal lines 50 connected to two transmission electrodes 40 with different distances from the binding region BA, the first signal line 501 with a larger length may be made of a material different from the second signal line 502 with a smaller length. Specifically, the resistivity of the first material for forming the first signal line 501 may be smaller than the resistivity of the second material for forming the second signal line 502. In one embodiment, each signal line 50 may have a same width. According to the general wire resistance calculation formula R=ρL/S, where ρ represents the resistivity of the wire material, which may be determined by its own material, L represents the length of the wire, and S represents the cross-sectional area of the wire, the smaller the resistivity, the smaller the resistance of the wire. Therefore, through configuring the first signal line 501 with a larger length to be made of the first material with a lower resistivity, and configuring the second signal line 502 with a smaller length to be made of the second material with a higher resistivity, the resistance difference between the first signal line 501 and the second signal line 502 may be reduced, which may improve the gain of the liquid crystal antenna and the phase accuracy of the entire liquid crystal antenna as much as possible.

It should be noted that FIG. 15 merely illustrates one first signal line 501 and one second signal line 502 that are made of different materials, which may not mean that there are merely these two signal lines 50 in the entire liquid crystal antenna 000 have the above relationship where the two signal lines 50 are made of different materials. In specific implementation, along the first direction X, the signal lines 50 connected to the plurality of transmission electrodes 40 close to the first edge 10A may be made of the first material with a smaller resistivity, and the signal lines 50 connected to the plurality of transmission electrodes 40 closed to the binding region BA may be made of the second material with a larger resistivity, to balance the resistance difference between the signal lines 50 of the liquid crystal antenna 000, which may not be specifically limited by the present disclosure.

Figure 16:
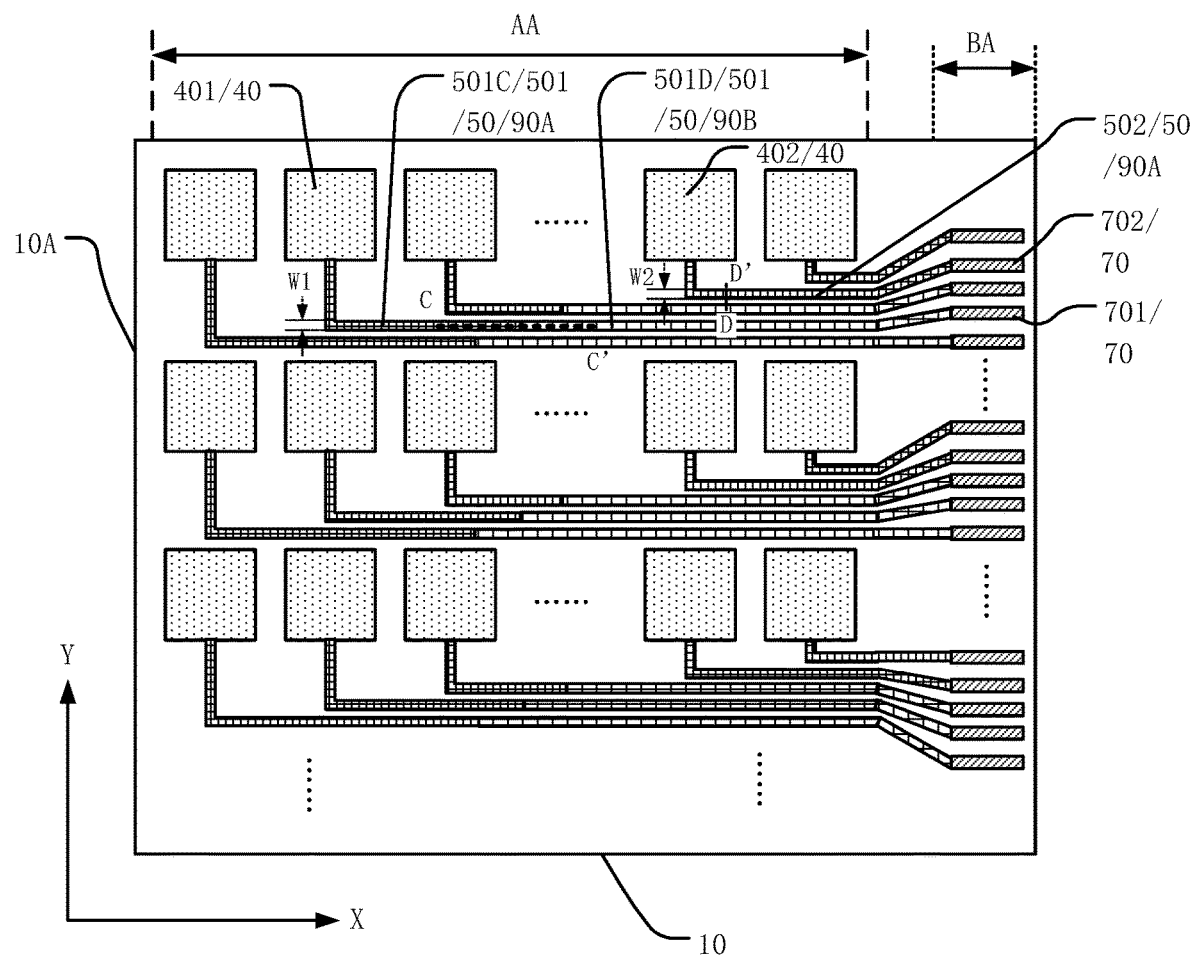
FIG. 16 illustrates a schematic top view of a side of another exemplary first substrate facing toward a second substrate in FIG. 1 consistent with disclosed embodiments of the present disclosure.
Figure 17:
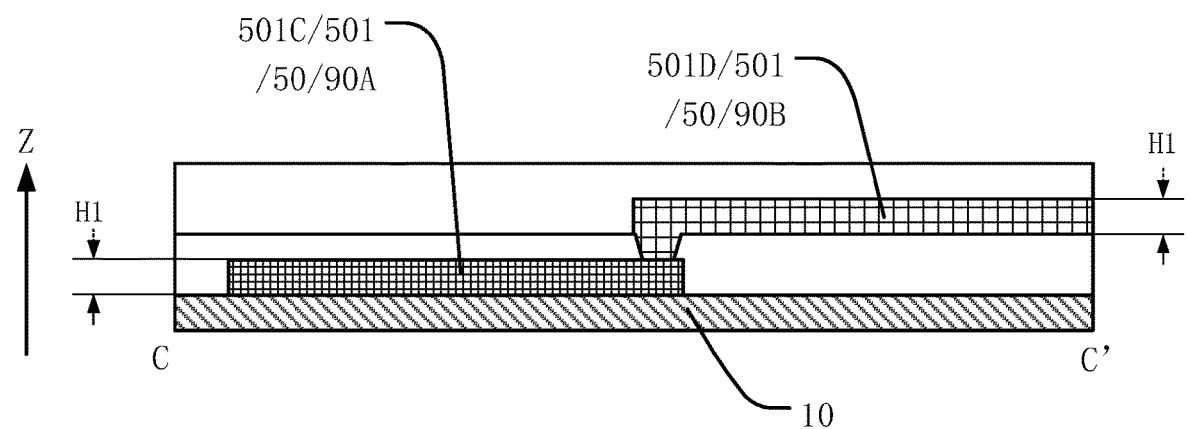
FIG. 17 illustrates a schematic CC'-sectional view of an exemplary first substrate in FIG. 16 consistent with disclosed embodiments of the present disclosure.
Figure 18:
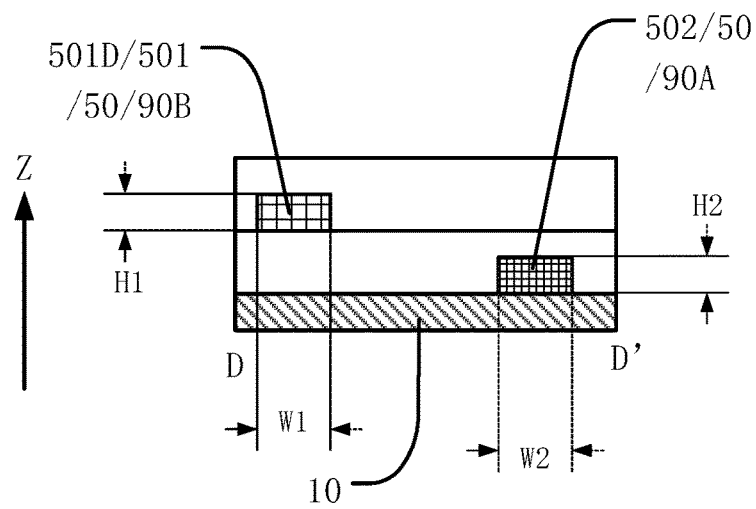
FIG. 18 illustrates a schematic DD'-sectional view of an exemplary first substrate in FIG. 16 consistent with disclosed embodiments of the present disclosure.

FIG. 16 illustrates a schematic top view of a side of another first substrate facing toward the second substrate in FIG. 1; FIG. 17 illustrates a schematic CC'-sectional view of the first substrate in FIG. 16; and FIG. 18 illustrates a schematic DD'-sectional view of the first substrate in FIG. 16. In certain embodiments, referring to FIG. 1 and FIGS. 16-18, along the direction Z perpendicular to the plane of the first substrate 10, a thickness H1 of the first signal line 501 may be the same as a thickness H2 of the second signal line 502. The width W1 of the first signal line 501 may be the same as the width W2 of the second signal line 502.

The first signal line 501 may include a seventh sub-segment 501C located in the first film layer 90A and an eighth sub-segment 501D located in the second film layer 90B. The seventh sub-segment 501C may be electrically connected to the eighth sub-segment 501D. The second signal line 502 may be located in the first film layer 90A. In other words, the second signal line 502 may be formed in a same layer and made of a same material as the seventh sub-segment 501C of the first signal line 501, and the seventh sub-segment 501C of the first signal line 501 and the eighth sub-segment 501D of the first signal line 501 may be formed in different layers and made of different materials. Optionally, in one embodiment, for illustrative purposes, the first film layer 90A may be disposed between the second film layer 90B and the first substrate 10 as an example. The positions of the first film layer 90A and the second film layer 90B on the first substrate 10 may be determined according to practical applications, as long as the resistivity of the material for forming the signal line located in the second film layer 90B is different from the resistivity of the material for forming the signal line located in the first film layer 90A, which may not be limited by the present disclosure.

The present disclosure may explain that to reduce the resistance difference between different signal lines 50 connected to the transmission electrode 40 at the far end and the transmission electrode 40 at the near end, the first signal line 501 connected to the first transmission electrode 401 at the far end may include a plurality of connected sub-segments, and the plurality of sub-segments may be located in different film layers. In one embodiment, the first signal line 501 may include the seventh sub-segment 501C located in the first film layer 90A and the eighth sub-segment 501D located in the second film layer 90B. The seventh sub-segment 501C and the eighth sub-segment 501D may be electrically connected to each other. Optionally, the seventh sub-segment 501C may be electrically connected to the eighth sub-segment 501D through a via. Both the second signal line 502 connected to the second transmission electrode 402 at the near end and the seventh sub-segment 501C may be located in the first film layer 90A, and the material for forming the first film layer 90A may have a resistivity different from the material for forming the second film layer 90B.

In the present disclosure, the first signal line 501 may include a structure formed by two materials with different resistivity. Among the seventh sub-segment 501C and the eighth sub-segment 501D, the sub-segment whose resistivity is smaller may have a larger length in the first signal line 501, and the sub-segment whose resistivity is larger may have a smaller length, to reduce the resistance of the first signal line 501 connected to the first transmission electrode 401 at the far end. Therefore, the resistance difference between the first signal line 501 and the second signal line 502 may be reduced, which may make the resistance of the first signal line 501 be consistent with the resistance of the second signal line 502 as much as possible, and may facilitate to improve the gain of the liquid crystal antenna and the phase accuracy of the entire liquid crystal antenna.

Optionally, the resistivity of the material for forming the eighth sub-segment 501D may be less than the resistivity of the material for forming the second signal line 502. Optionally, in one embodiment, for illustrative purposes, the first film layer 90A may be disposed between the second film layer 90B and the first substrate 10 as an example. The positions of the first film layer 90A and the second film layer 90B on the first substrate 10 may be determined according to practical applications, as long as the resistivity of the material for forming the signal line located in the second film layer 90B is less than the resistivity of the material for forming the signal line located in the first film layer 90A, which may not be limited by the present disclosure.

In the present disclosure, the resistivity of the material for forming the eighth sub-segment 501D may be less than the resistivity of the material for forming the second signal line 502, and the resistivity of the material for forming the second signal line 502 may be the same as the resistivity of the material for forming the seventh sub-segment 501C. The first signal line 501 which is originally made of a same material and has a same width and thickness as the second signal line 502 may include the eighth sub-segment 501D formed in a film layer different from the second signal line 502, and the eighth sub-segment 501D may be made of a material with a smaller resistivity. Therefore, the overall resistance of the first signal line 501 may be reduced, and the resistance of the first signal line 501 may be consistent with the resistance of the second signal line 502 as much as possible, which may facilitate to improve the gain of the liquid crystal antenna and the phase accuracy of the entire liquid crystal antenna.

Figure 19:
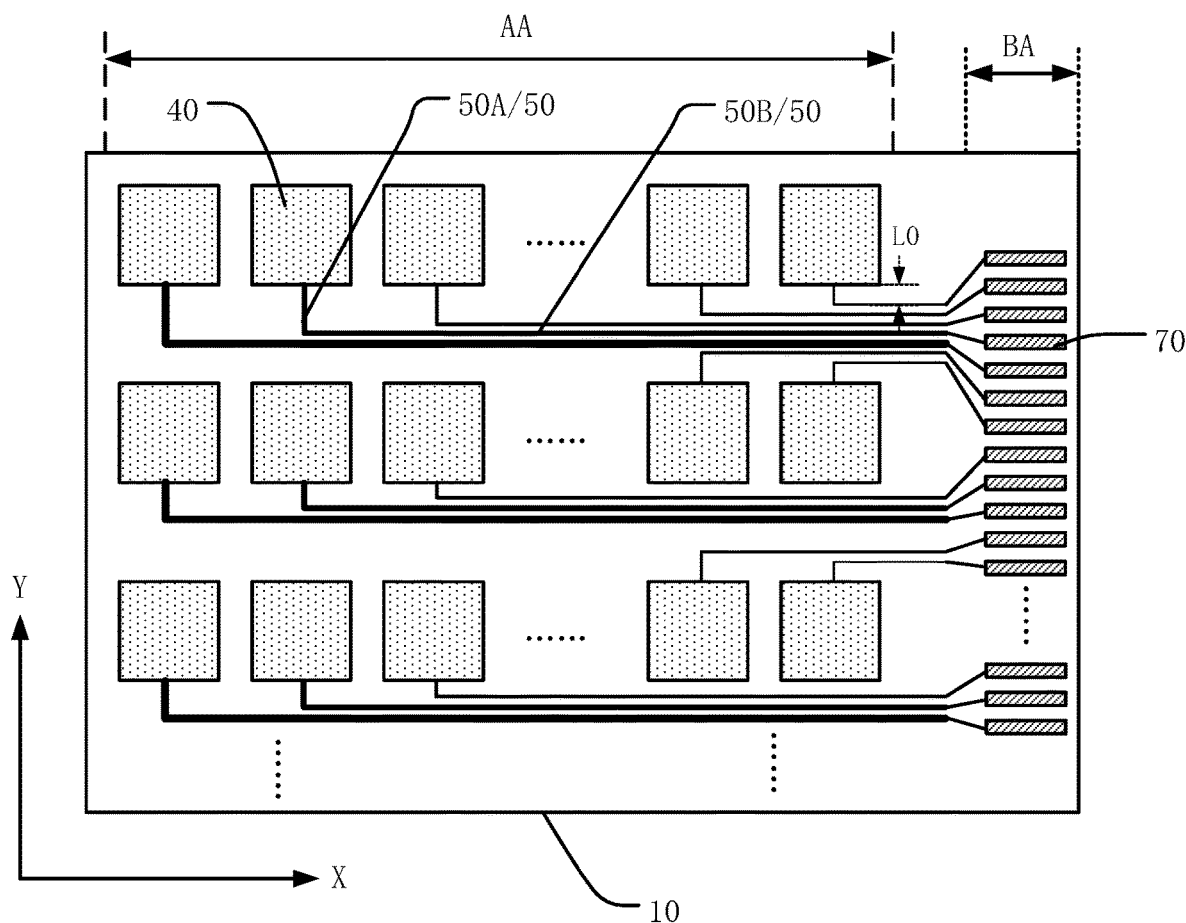
FIG. 19 illustrates a schematic top view of a side of another exemplary first substrate facing toward a second substrate in FIG. 1 consistent with disclosed embodiments of the present disclosure.

FIG. 19 illustrates a schematic top view of a side of another first substrate facing toward the second substrate in FIG. 1. In certain embodiments, referring to FIG. 1 and FIG. 19, the signal line 50 may at least include a first portion 50A and a second portion 50B. One end of the first portion 50A may be connected to the transmission electrode 40, the other end of the first portion 50A may be connected to one end of the second portion 50B, and the other end of the second portion 50B may be connected to the signal terminal 70. An extension direction of the first portion 50A may intersect an extension direction of the second portion 50B. A distance L0 between the second portion 50B and the transmission electrode 40 may be greater than or equal to 100 μm.

It should be understood that the first portion 50A and the second portion 50B may merely represent two portions of the signal line 50 with different extension directions, and may not represent the sub-segments in the above-disclosed embodiments. The width of the first portion 50A and the second portion 50B in a direction perpendicular to the extension direction of the signal line 50 and the thickness of the first portion 50A and the second portion 50B in the direction perpendicular to the plane of the first substrate 10 may not be limited by the present disclosure, and may be determined according to practical applications.

The present disclosure may explain that the signal line 50 may at least include the first portion 50A and the second portion 50B that are extended in different directions and connected to each other. The first portion 50A may be connected to the transmission electrode 40, and the second portion 50B may be connected to the signal terminal 70. Therefore, the signal transmission between each transmission electrode 40 and the signal terminal 70 in the binding region BA may be achieved through the signal line 50. In one embodiment, because the first region AA where the transmission electrodes 40 are disposed and the binding region BA where the signal terminals 70 are disposed are arranged in the first direction X, the extension direction of the first portion 50A drawn from the transmission electrode 40 may intersect or be perpendicular to the first direction X. Referring to FIG. 19, the extension direction of the first portion 50A may be the second direction Y perpendicular to the first direction X. After bending the second portion 50B that has an extension direction same as the first direction X, the transmission electrode 40 may be connected to the signal terminal 70 in the binding region BA.

In the present disclosure, the distance L0 between the second portion 50B and the transmission electrode 40 may be greater than or equal to 100 μm. Referring to FIG. 19, for illustrative purposes, the second portion 50B of the signal line 50 connected to the transmission electrode 40 closest to the binding region BA may be used as an example, the distance L0 between the second portion 50B and the transmission electrode 40 shown in FIG. 19 may be greater than or equal to 100 μm. In other words, the second portion 50B and the transmission electrode 40 may be spaced apart by a safe distance L0 as much as possible. Because the liquid crystal antenna 000 often operates in a high-frequency environment, through configuring the distance L0 between the second portion 50B and the transmission electrode 40 to be greater than or equal to 100 μm, the second portion 50B may be prevented from being too close to the transmission electrode 40 to increase the coupling between the high-frequency signal of the transmission electrode 40 and the second portion 50B of the signal line 50, which may facilitate to improve the performance of the liquid crystal antenna.

Figure 20:
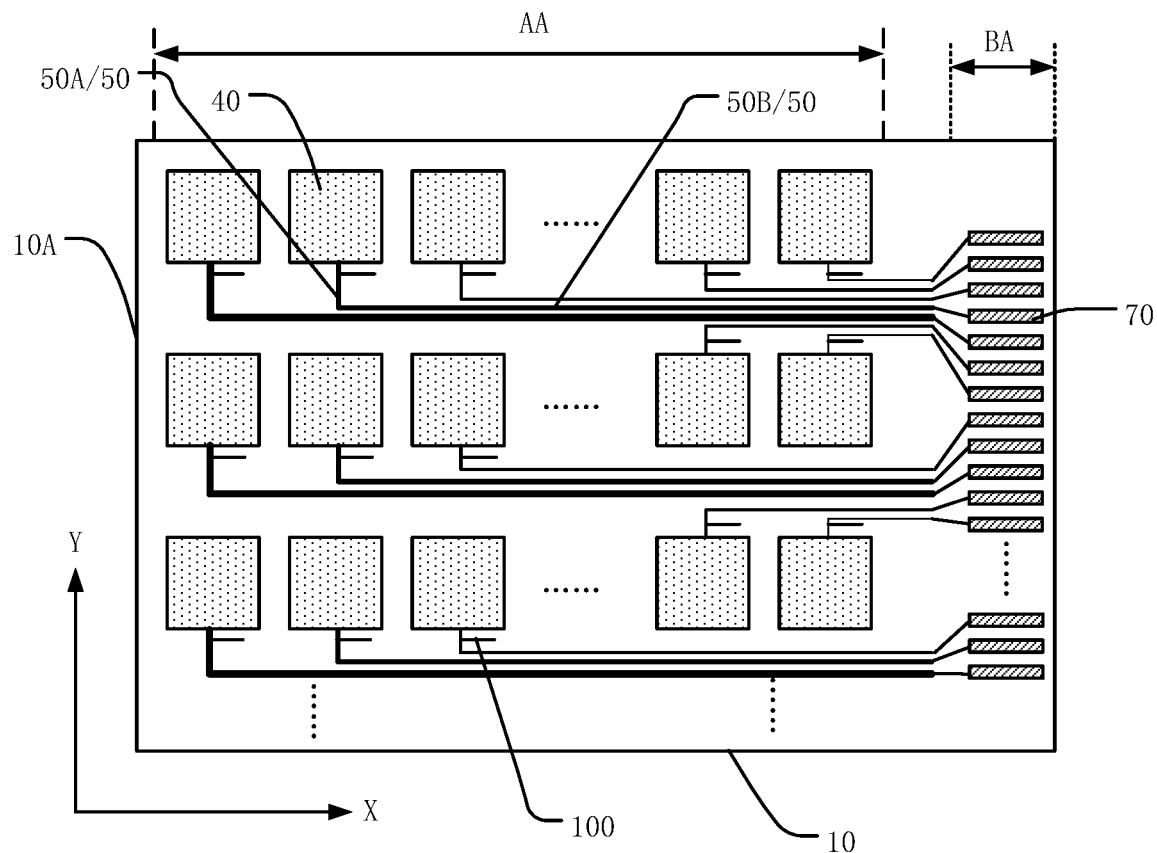
FIG. 20 illustrates a schematic top view of a side of another exemplary first substrate facing toward a second substrate in FIG. 1 consistent with disclosed embodiments of the present disclosure.

FIG. 20 illustrates a schematic top view of a side of another first substrate facing toward the second substrate in FIG. 1. In certain embodiments, referring to FIG. 1 and FIG. 20, a plurality of choke structures 100 may be disposed on the side of the first substrate 10 facing toward the second substrate 20, and a choke structure 100 may be connected to the first portion 50A of the signal line 50. An extension direction of the choke structure 100 may intersect the extension direction of the first portion 50A.

In the present disclosure, because the transmission electrode 40 of the liquid crystal antenna 000 often works in a high-frequency environment, and the signal terminal 70 often inputs a direct current (DC) power signal through the signal line 50, to avoid the high-frequency signal from affecting the DC power signal, the plurality of choke structures 100 may be disposed on the side of the first substrate 10 facing toward the second substrate 20. The choke structure 100 may be connected to the first portion 50A of the signal line 50, and the extension direction of the choke structure 100 may intersect the extension direction of the first portion 50A.

In the present disclosure, the choke structure 100 may serve as a capacitor, and may short-circuit the high-frequency signal in the transmission electrode 40, thereby reducing the influence of the high-frequency signal on the DC power signal. The choke structure 100 may isolate the high-frequency signal from the DC signal, such that the high-frequency signal may not be conducted to the DC signal, thereby reducing the high-frequency signal loss of the transmission electrode 40 caused by the connection to the signal line 50 for transmitting the DC signal, which may facilitate to improve the performance of the transmission electrode 40.

It should be understood that in one embodiment, the transmission electrode 40 may have a microstrip line structure as an example. The transmission electrode 40 may be at the high frequency terminal, and the signal line 50 may be at the DC terminal. When the liquid crystal antenna 000 is operating, the high frequency signal may merely need to circulate between every transmission electrodes 40, and may not leak to the DC terminal (otherwise, the insertion loss of the high-frequency signal may increase).

Figure 21:
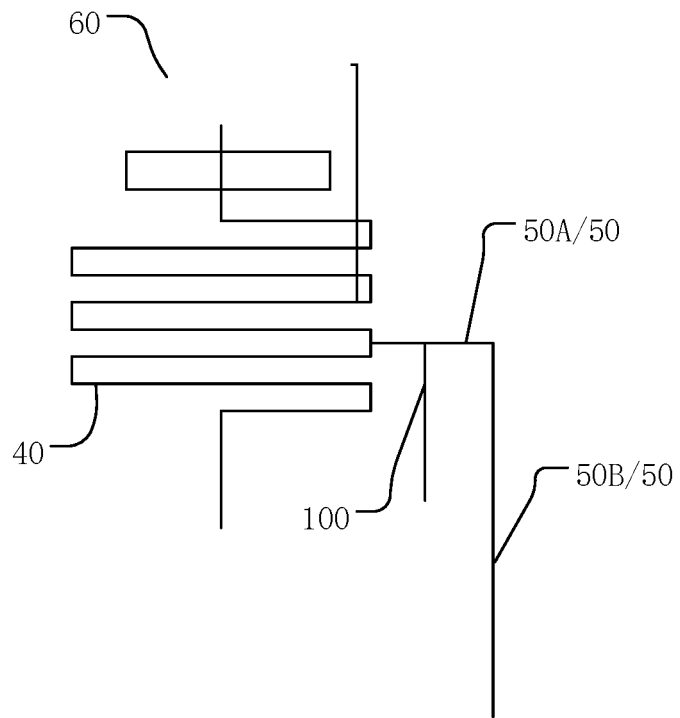
FIG. 21 illustrates a schematic diagram of a working principle of a choke structure consistent with disclosed embodiments of the present disclosure.

A working principle of the choke structure 100 may be illustrated in FIG. 21. FIG. 21 illustrates a schematic diagram of the working principle of the choke structure. A capacitor and a certain amount of inductance (not illustrated in the Figure) may be formed between the choke structure 100 and the ground electrode 60. The electrical parameters of the choke structure 100 may be adjusted by reasonably adjusting the length of the choke structure 100. When the length of the choke structure 100 is adjusted to an appropriate range, the signal in a specific frequency band (i.e., the signal of the required working frequency band) may be prevented from being transmitted from the high frequency band to the low frequency band.

It should be understood that the choke structure 100 may have a short straight line structure as shown in FIG. 20. In one embodiment, the choke structure 100 may be formed in a same layer and made of a same material as the signal line 50. In another embodiment, the choke structure 100 may be separately formed with a different material, such as a printed silver wire, which may not be limited by the present disclosure, and may be determined according to practical applications.

Optionally, the distance between the choke structure 100 and the transmission electrode 40, the length of the choke structure 100, and the size of the choke structure 100 may not be limited by the present disclosure, and may be determined according to the required isolated high-frequency signal in practical applications.

Figure 22:
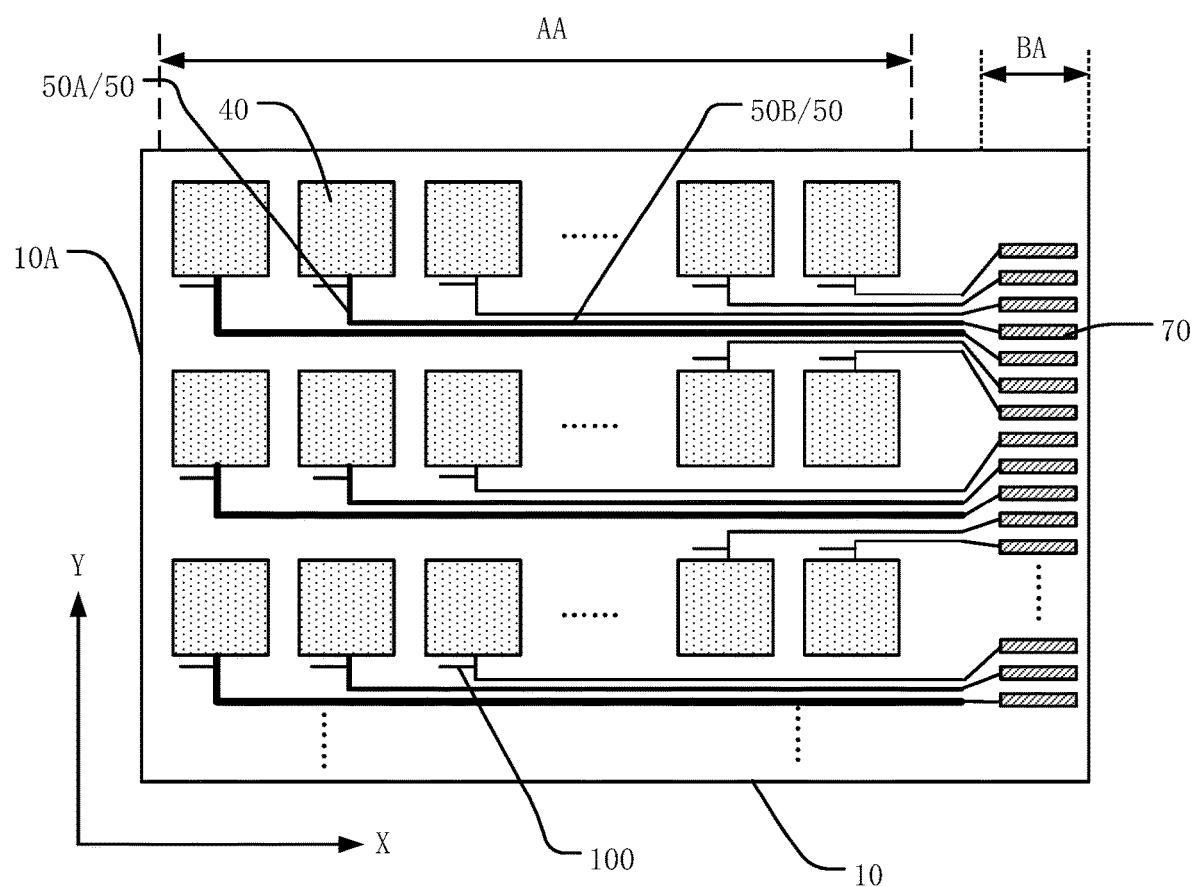
FIG. 22 illustrates a schematic top view of a side of another exemplary first substrate facing toward a second substrate in FIG. 1 consistent with disclosed embodiments of the present disclosure.
Figure 23:
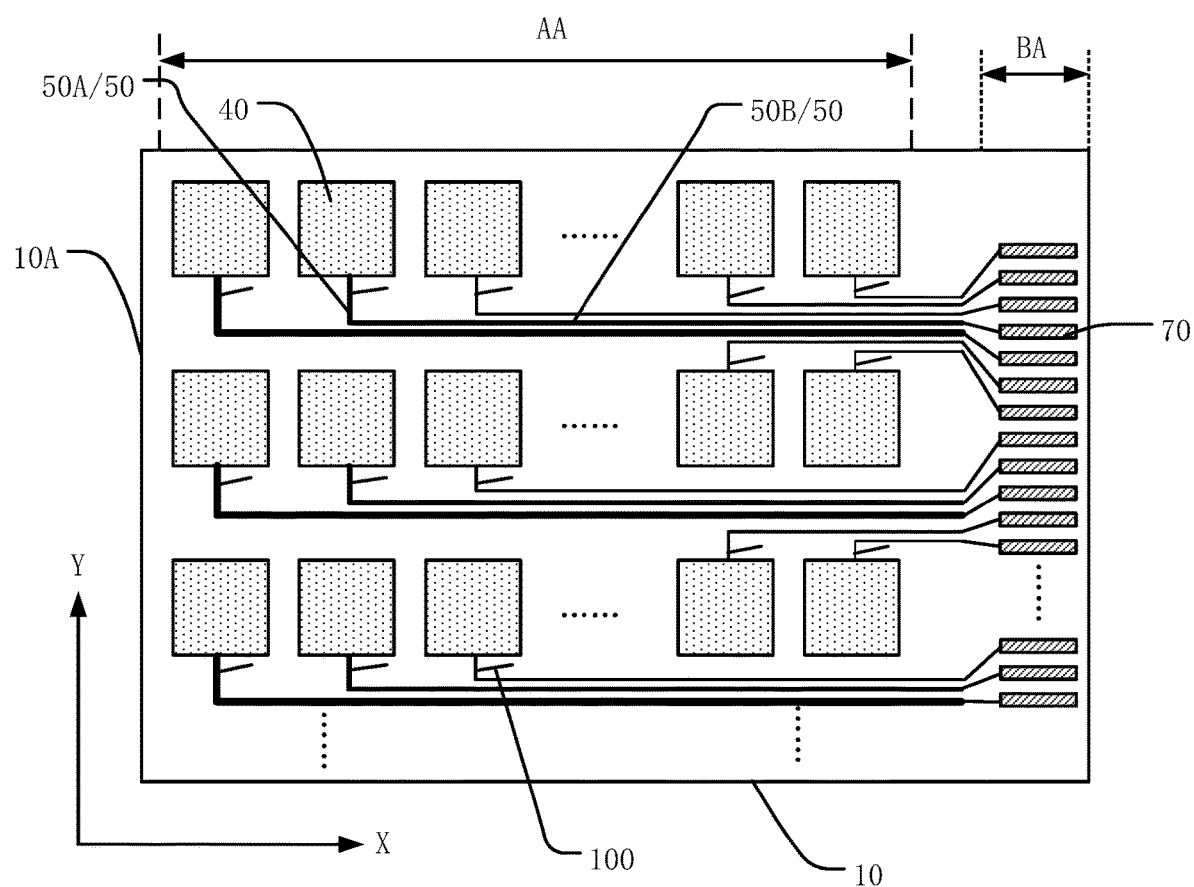
FIG. 23 illustrates a schematic top view of a side of another exemplary first substrate facing toward a second substrate in FIG. 1 consistent with disclosed embodiments of the present disclosure.
Figure 24:
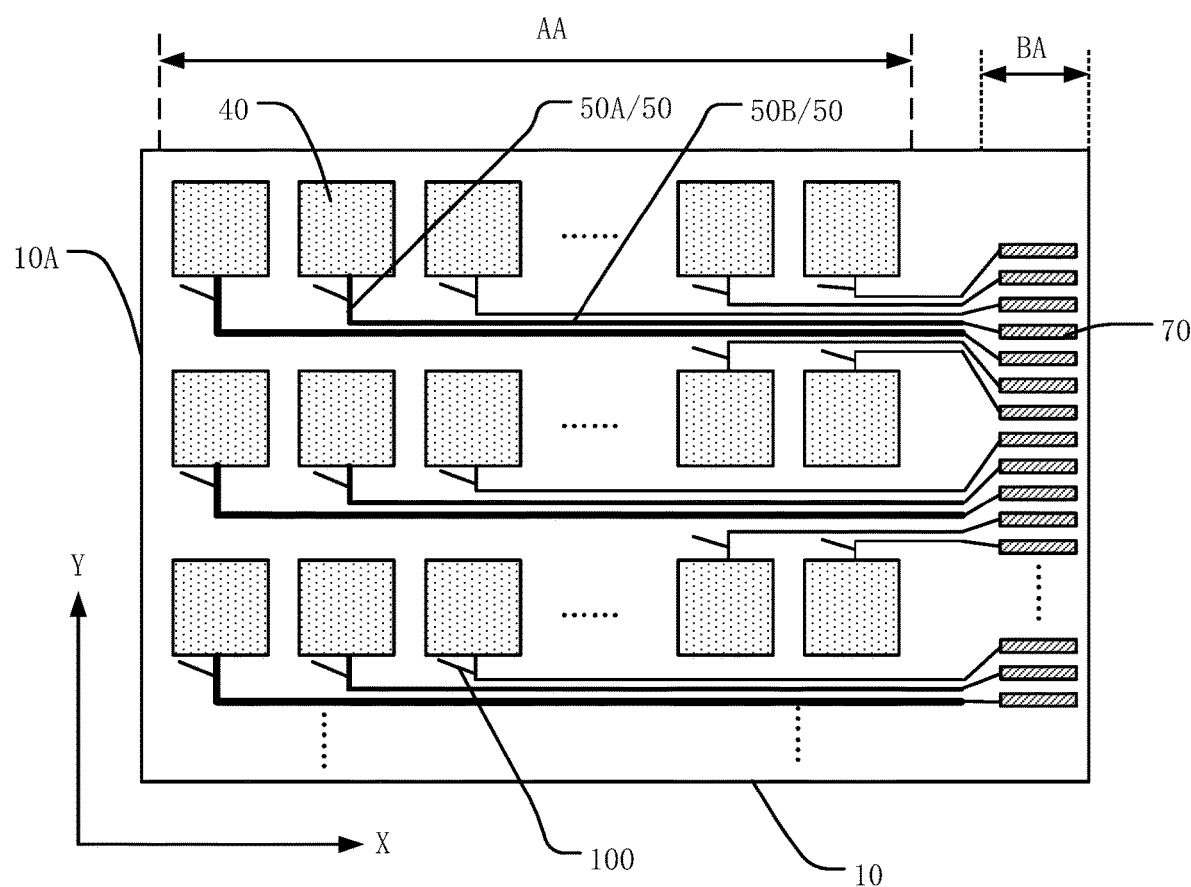
FIG. 24 illustrates a schematic top view of a side of another exemplary first substrate facing toward a second substrate in FIG. 1 consistent with disclosed embodiments of the present disclosure.
Figure 25:
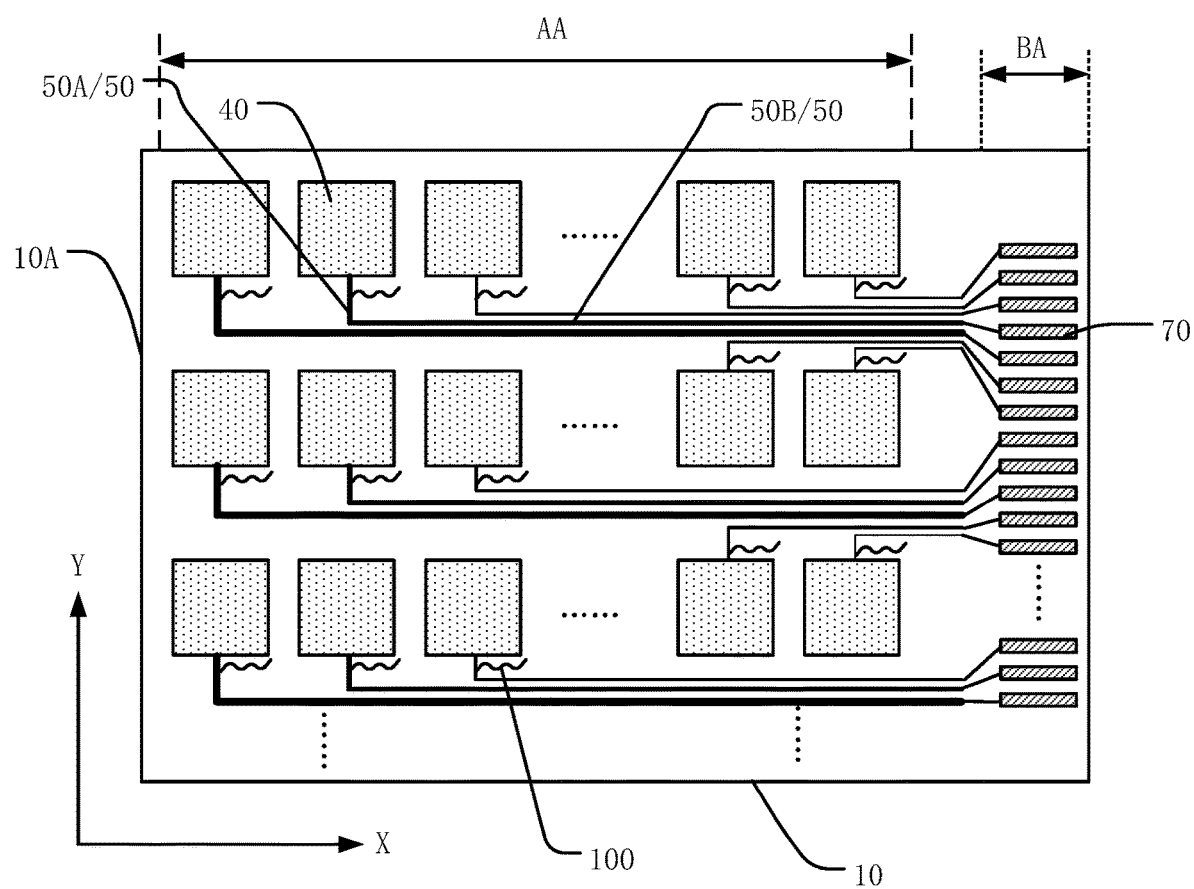
FIG. 25 illustrates a schematic top view of a side of another exemplary first substrate facing toward a second substrate in FIG. 1 consistent with disclosed embodiments of the present disclosure.
Figure 26:
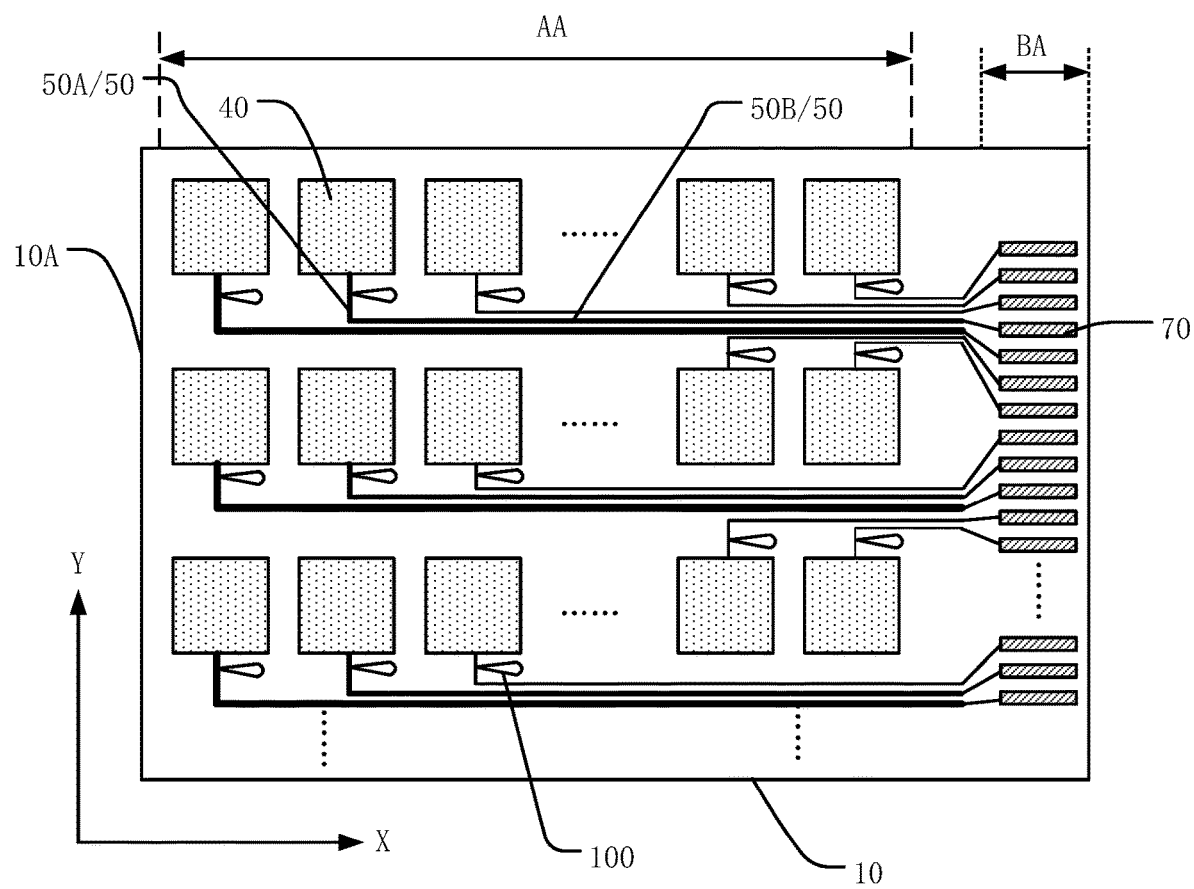
FIG. 26 illustrates a schematic top view of a side of another exemplary first substrate facing toward a second substrate in FIG. 1 consistent with disclosed embodiments of the present disclosure.
Figure 27:
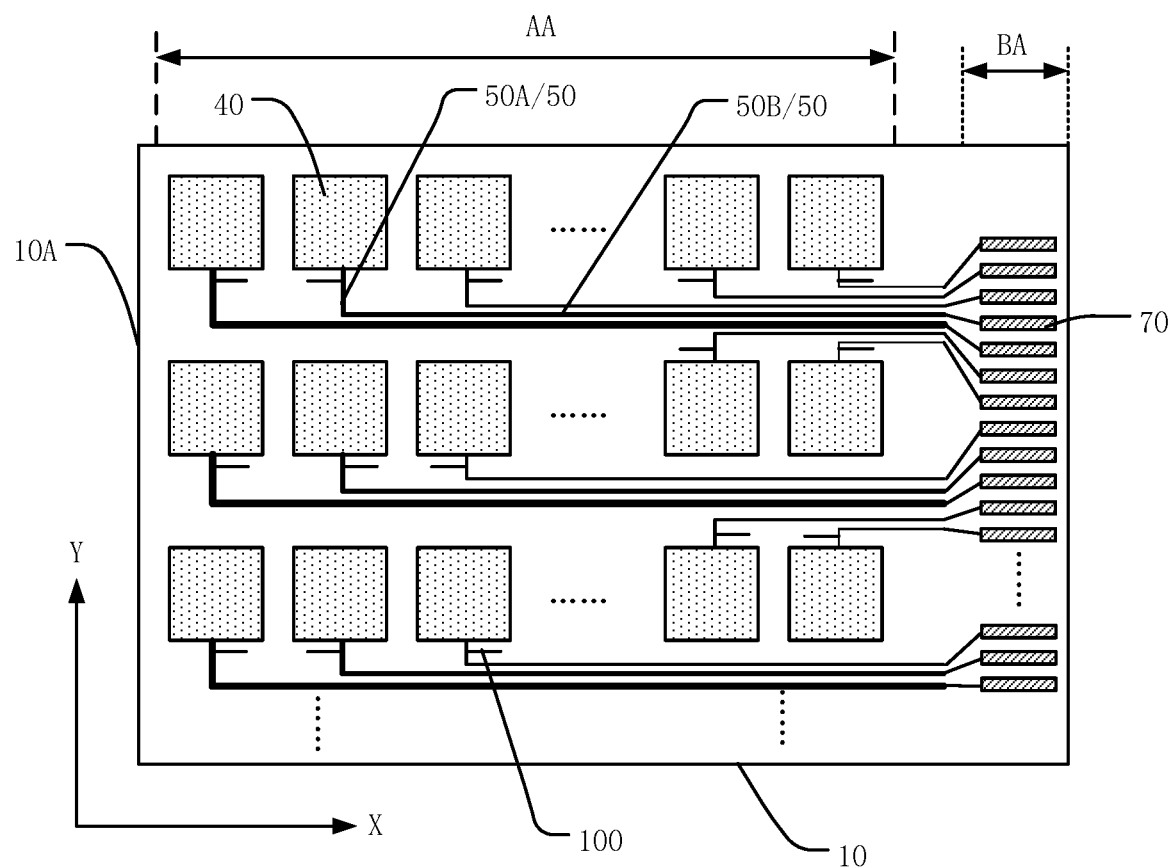
FIG. 27 illustrates a schematic top view of a side of another exemplary first substrate facing toward a second substrate in FIG. 1 consistent with disclosed embodiments of the present disclosure.

FIG. 22 illustrates a schematic top view of a side of another first substrate facing toward the second substrate in FIG. 1. FIG. 23 illustrates a schematic top view of a side of another first substrate facing toward the second substrate in FIG. 1. FIG. 24 illustrates a schematic top view of a side of another first substrate facing toward the second substrate in FIG. 1. FIG. 25 illustrates a schematic top view of a side of another first substrate facing toward the second substrate in FIG. 1. FIG. 26 illustrates a schematic top view of a side of another first substrate facing toward the second substrate in FIG. 1. FIG. 27 illustrates a schematic top view of a side of another first substrate facing toward the second substrate in FIG. 1.

Optionally, referring to FIG. 20 and FIGS. 22-27, the extension direction of the choke structure 100 may intersect the extension direction of the first portion 50A, and an end of the choke structure 100 with the straight line structure that is not connected to the first portion 50A may orient toward a direction close to the binding region BA as shown in FIG. 20. The end of the choke structure 100 with the straight line structure that is not connected to the first portion 50A may orient toward a direction close to the first edge 10A of the first substrate 10 as shown in FIG. 22. The extension direction of the choke structure 100 with the straight line structure may be the same as the extension direction of the second portion 50B. In other words, the choke structure 100 with the straight line structure may be extended along the first direction X. In another embodiment, referring to FIG. 23 and FIG. 24, the extension direction of the choke structure 100 with the straight line structure may intersect the first direction X. In other words, the choke structure 100 with the straight line structure may be obliquely extended.

Referring to FIG. 25, the choke structure 100 may have a curved structure. Referring to FIG. 26, the choke structure 100 may have a sector structure. Further, the choke structure 100 may have two ends, one end may be connected to the first portion 50A, and the other one end may not be connected to the first portion 50A. Among the plurality of different choke structures 100, the orientations of the ends that are not connected to the first portion 50A may be exactly the same (e.g., entire ends may face toward right as shown in FIGS. 20, 23, 25, 26, or entire ends may face toward left as shown in FIGS. 22, 24), or may be partly the same (e.g., a portion of the ends may face toward right, and another portion of the ends may face toward left, as shown in FIG. 27). The isolation performance of the choke structure 100 may be mainly related to the length of the choke structure 100 in the extension direction thereof. The shape and extension direction of the choke structure 100, and the orientation of the end of the choke structure 100 that is not connected to the first portion 50A may not be limited by the present disclosure, as long as the choke structure 100 is capable of reducing the influence of high-frequency signal on the DC power signal and is capable of isolating the high-frequency signal from the DC signal.

Figure 28:
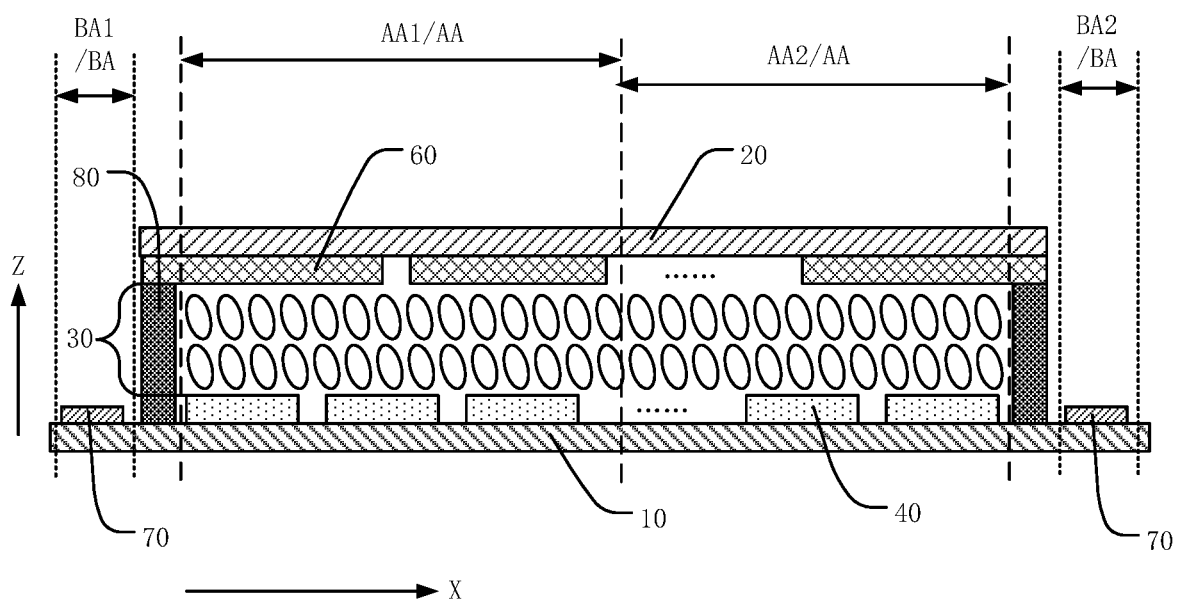
FIG. 28 illustrates a schematic diagram of another exemplary liquid crystal antenna consistent with disclosed embodiments of the present disclosure.
Figure 29:
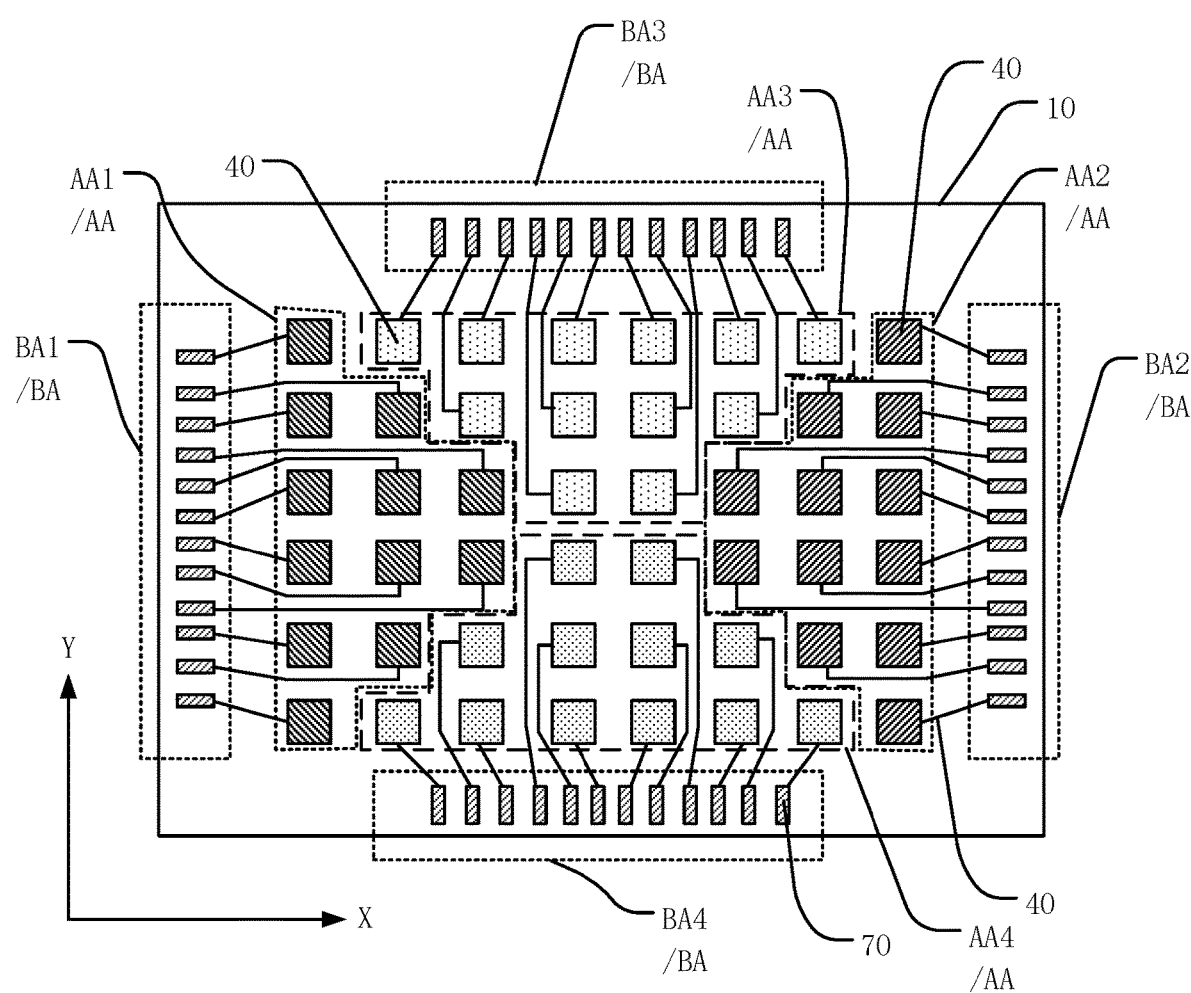
FIG. 29 illustrates a schematic top view of a side of an exemplary first substrate facing toward a second substrate in FIG. 28 consistent with disclosed embodiments of the present disclosure.

FIG. 28 illustrates a schematic diagram of another liquid crystal antenna consistent with disclosed embodiments of the present disclosure; and FIG. 29 illustrates a schematic top view of a side of a first substrate facing toward a second substrate in FIG. 28. To clearly illustrate the structure of the liquid crystal antenna, the first substrate in FIG. 29 may not be filled. In certain embodiments, referring to FIG. 28 and FIG. 29, the binding region BA may include a first binding region BA1, a second binding region BA2, a third binding region BA3, and a fourth binding region BA4. The first binding region BA1 and the second binding region BA2 may be disposed on opposite sides of the first region AA along the first direction X, and the third binding region BA3 and the fourth binding region BA4 may be disposed on opposite sides of the first region AA along the second direction Y.

The first region AA may include a first sub-region AA1 close to the first binding region BA1, a second sub-region AA2 close to the second binding region BA2, a third sub-region AA3 close to the third binding region BA3, and a fourth sub-region AA4 close to the fourth binding region BA4.

The transmission electrode 40 in the first sub-region AA1 may be connected to the signal terminal 70 in the first binding region BA1 through the signal line 50. The transmission electrode 40 in the second sub-region AA2 may be connected to the signal terminal 70 in the second binding region BA2 through the signal line 50. The transmission electrode 40 in the third sub-region AA3 may be connected to the signal terminal 70 in the third binding region BA3 through the signal line 50. The transmission electrode 40 in the fourth sub-region AA4 may be connected to the signal terminal 70 in the fourth binding region BA4 through the signal line 50.

In the present disclosure, the liquid crystal antenna 000 may include four binding regions, including the first binding region BA1 and the second binding region BA2 disposed on opposite sides of the first region AA in the first direction X, and the third binding region BA3 and the fourth binding region BA4 disposed on opposite sides of the first region AA in the second direction Y. Optionally, the four edges of the first substrate 10 may be beyond the edges of the second substrate 20 at a same side, and the excess portions may be four step regions of the liquid crystal antenna 000, which may be used as the four binding regions BA. In view of this, a plurality of signal terminals 70 in each binding region may be disposed on the side of the first substrate 10 facing toward the second substrate 20.

In the present disclosure, the first region AA where the transmission electrodes 40 are located may include a plurality of sub-regions, and each corresponding to a binding region. The plurality of sub-regions may include the first sub-region AA1 close to the first binding region BA1, the second sub-region AA2 close to the second binding region BA2, the third sub-region AA3 close to the third binding region BA3, and the fourth sub-region AA4 close to the fourth binding region BA4.

The transmission electrode 40 in the first sub-region AA1 may be connected to the signal terminal 70 in the first binding region BA1 closest to the first sub-region AA1 through the signal line 50. The transmission electrode 40 in the second sub-region AA2 may be connected to the signal terminal 70 in the second binding region BA2 closest to the second sub-region AA2 through the signal line 50. The transmission electrode 40 in the third sub-region AA3 may be connected to the signal terminal 70 in the third binding region BA3 closest to the third sub-region AA3 through the signal line 50. The transmission electrode 40 in the fourth sub-region AA4 may be connected to the signal terminal 70 in the fourth binding region BA4 closest to the fourth sub-region AA4 through the signal line 50.

Therefore, the transmission electrodes 40 at different positions may be connected to the closest binding region BA by the principle of proximity through the signal lines 50, and the resistance difference between the signal lines 50 connected to the transmission electrodes 40 at different positions may be reduced. When the liquid crystal antenna 000 is working, power may be simultaneously supplied through the signal terminals 70 in the four binding regions BA, such that synchronization and precise control of the phase synchronization output may be achieved, which may improve the gain of the liquid crystal antenna and the phase accuracy of the entire liquid crystal antenna.

It should be understood that the disclosed liquid crystal antenna 000 may minimize the influence caused by the resistance difference between different signal lines 50, and at the same time, may be applied to a scene of single antenna (single liquid crystal antenna 000) that does not require a high communication rate. In a scene that requires a substantially high communication rate, the flexible circuit boards bound to the four different binding regions may be bent toward the side of the first substrate 10 away from the second substrate 20, to splice multiple disclosed liquid crystal antennas 000 to meet the requirements of the high communication rate.

It should be noted that FIG. 29 merely exemplarily illustrates quantities of transmission electrodes 40 and signal terminals 70, and the division manner of each sub-region of the first region AA as an example. In specific implementation, the quantities of transmission electrodes 40 and signal terminals 70, and the division manner of each sub-region of the first region AA may be determined according to practical applications, which may not be limited by the present disclosure.

Figure 30:
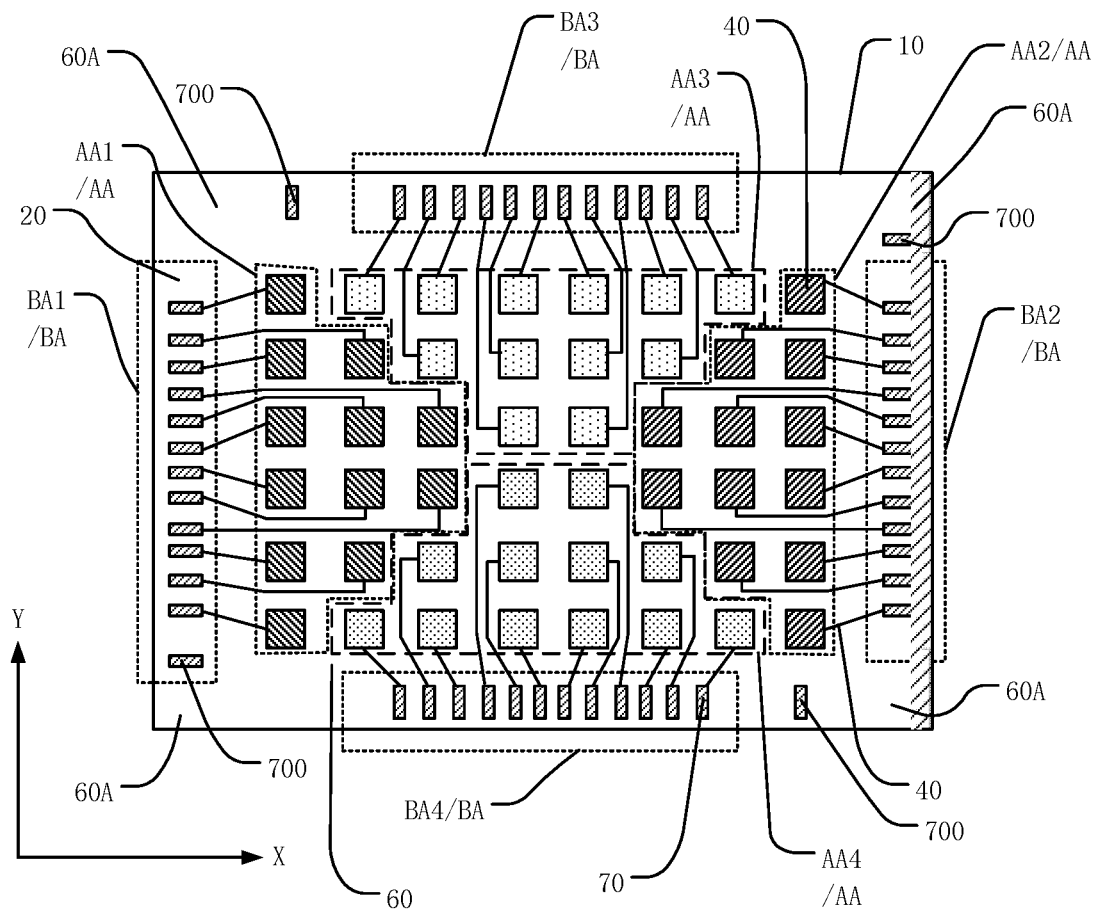
FIG. 30 illustrates a schematic top view of another exemplary first substrate in FIG. 28 consistent with disclosed embodiments of the present disclosure.

FIG. 30 illustrates a schematic top view of the first substrate in FIG. 28. To clearly illustrate the structure of the liquid crystal antenna, the transparency filling is shown in FIG. 30. In certain embodiments, referring to FIGS. 28-30, in one embodiment, the ground electrode 60 may be connected with a plurality of input terminals 60A, and the plurality of input terminals 60A may be evenly arranged surrounding the first region AA.

In the present disclosure, the ground electrode 60 may be electrically connected to a ground signal terminal 700 of the binding region BA. Optionally, a conductive gold ball may be provided in the frame sealant 80. The ground electrode 60 disposed on the side of the second substrate 20 facing toward the first substrate 10 may be electrically connected to the ground signal terminal 700 disposed on the side of the first substrate 10 facing toward the second substrate 20 through the conductive gold ball, to provide a ground signal for the ground electrode 60. The ground electrode 60 may be connected with the plurality of input terminals 60A, and the plurality of input terminals 60A may be evenly arranged surrounding the first region AA.

Optionally, referring to FIG. 30, there may be four input terminals 60A, and the four input terminals 60A may be located at four corner positions of the second substrate 20. In another embodiment, the four input terminals 60A may be evenly arranged at multiple positions of the second substrate 20 close to the edge of the substrate. For illustrative purposes, FIG. 30 may illustrate that the four input terminals are located at four corner positions of the second substrate as an example. In the present disclosure, the ground electrode 60 may be connected with a plurality of input terminals 60A, and the input terminal 60A may be configured to be electrically connected to the ground signal terminal 700 in the binding region BA, to input the ground signal. The plurality of input terminals 60A may surround the first region AA and may evenly provide the ground signal. Therefore, the electric fields between the ground electrode 60 and the transmission electrode 40 at different positions of the liquid crystal antenna 000 for deflecting the liquid crystal molecules of the liquid crystal layer 30 may be substantially stable and uniform, which may achieve synchronization and precise control of phase synchronization output of the phase shifter, may make phase control substantially accurate, and may facilitate to further improve the performance of the liquid crystal antenna.

Figure 31:
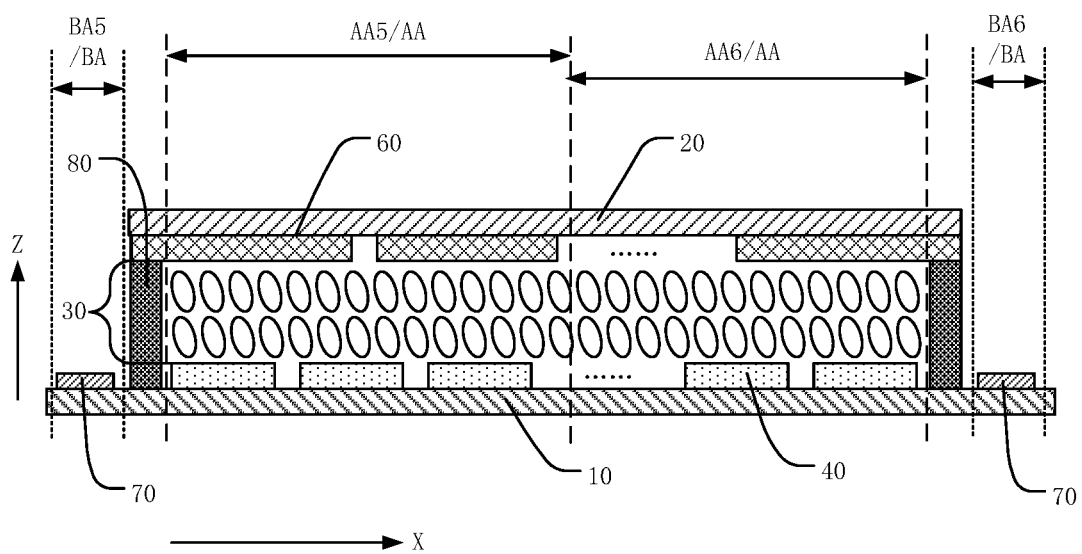
FIG. 31 illustrates a schematic diagram of another exemplary liquid crystal antenna consistent with disclosed embodiments of the present disclosure.
Figure 32:
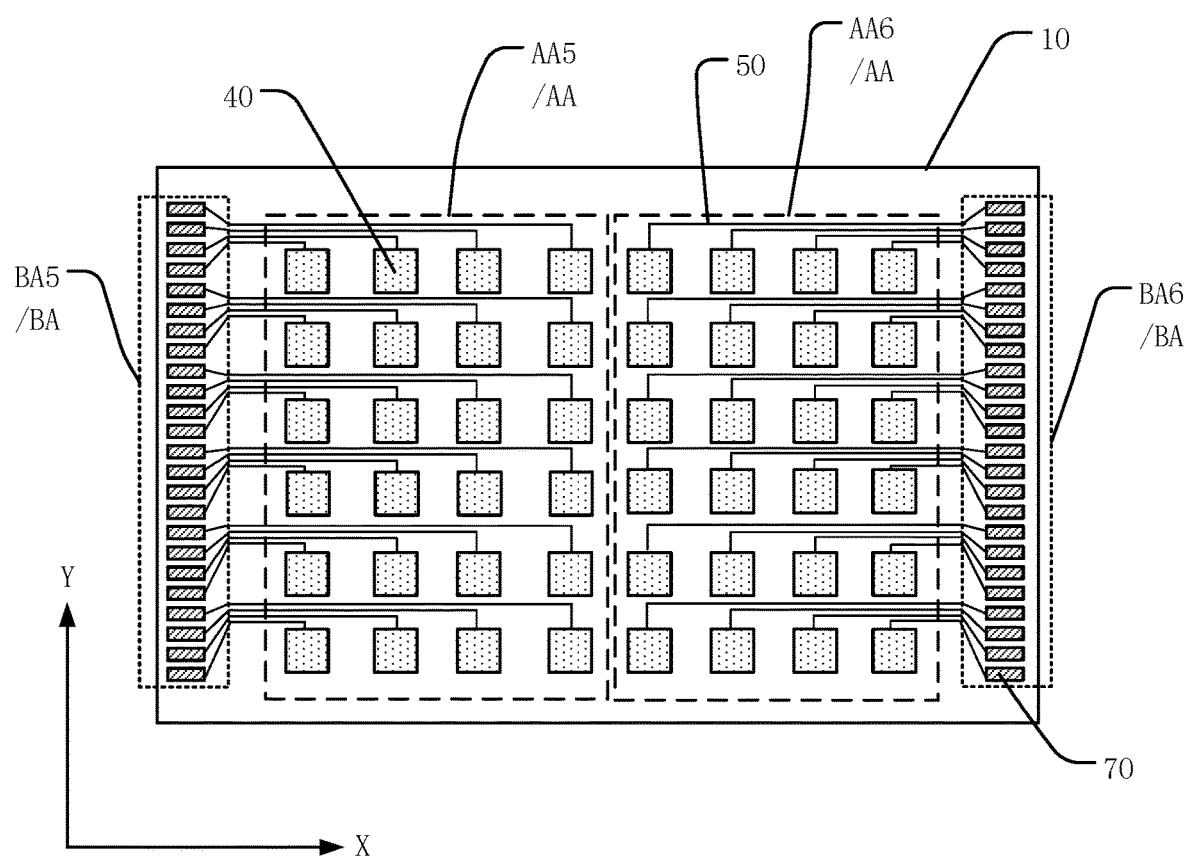
FIG. 32 illustrates a schematic top view of a side of an exemplary first substrate facing toward a second substrate in FIG. 31 consistent with disclosed embodiments of the present disclosure.

FIG. 31 illustrates a schematic diagram of another liquid crystal antenna consistent with disclosed embodiments of the present disclosure; and FIG. 32 illustrates a schematic top view of a side of a first substrate facing toward a second substrate in FIG. 31. To clearly illustrate the structure of the liquid crystal antenna, the first substrate in FIG. 32 may not be filled. In certain embodiments, referring to FIG. 31 and FIG. 32, the binding region BA may include a fifth binding region BA5 and a sixth binding region BA6. In one embodiment, the fifth binding region BA5 and the sixth binding region BA6 may be disposed on opposite sides of the first region AA along the first direction X. In another embodiment, the fifth binding region BA5 and the sixth binding region BA6 may be disposed on opposite sides of the first region AA along the second direction Y (not shown in the Figure). In certain embodiments, the fifth binding region BA5 and the sixth binding region BA6 may be disposed on two adjacent sides of the liquid crystal antenna 000 (not shown in the Figure).

The first region AA may include a fifth sub-region AA5 close to the fifth binding region BA5, and a sixth sub-region AA6 close to the sixth binding region BA6. The transmission electrode 40 in the fifth sub-region AA5 may be connected to the signal terminal 70 in the fifth binding region BA5 through the signal line 50. The transmission electrode 40 in the sixth sub-region AA6 may be connected to the signal terminal 70 in the sixth binding region BA6 through the signal line 50.

In the present disclosure, the liquid crystal antenna 000 may include two binding regions. In one embodiment, the two binding regions may include the fifth binding region BA5 and the sixth binding region BA6 disposed on opposite sides of the first region AA in the first direction X. In another embodiment, the two binding regions may include the fifth binding region BA5 and the sixth binding region BA6 disposed on opposite sides of the first region AA in the second direction Y. In certain embodiments, the two binding regions may include the fifth binding region BA5 and the sixth binding region BA6 disposed on two adjacent sides of the liquid crystal antenna 000. Optionally, the two edges of the first substrate 10 may be beyond the edges of the second substrate 20 at a same side, and the excess portions may be two step regions of the liquid crystal antenna 000, which may be used as the two binding regions BA. In view of this, a plurality of signal terminals 70 in each binding region may be disposed on the side of the first substrate 10 facing toward the second substrate 20.

In the present disclosure, the first region AA where the transmission electrodes 40 are located may include a plurality of sub-regions, and each corresponding to a binding region. The plurality of sub-regions may include the fifth sub-region AA5 close to the fifth binding region BA5, and the sixth sub-region AA6 close to the sixth binding region BA6. The transmission electrode 40 in the fifth sub-region AA5 may be connected to the signal terminal 70 in the fifth binding region BA5 closest to the fifth sub-region AA5 through the signal line 50. The transmission electrode 40 in the sixth sub-region AA6 may be connected to the signal terminal 70 in the sixth binding region BA6 closest to the sixth sub-region AA6 through the signal line 50.

Therefore, the transmission electrodes 40 at different positions may be connected to the closest binding region BA by the principle of proximity through the signal lines 50, and the resistance difference between the signal lines 50 connected to the transmission electrodes 40 at different positions may be reduced. When the liquid crystal antenna 000 is working, power may be simultaneously supplied through the signal terminals 70 in the two binding regions BA, such that synchronization and precise control of the phase synchronization output may be achieved, which may improve the gain of the liquid crystal antenna and the phase accuracy of the entire liquid crystal antenna.

It should be understood that the resistance difference between different signal lines may be reduced by the above-disclosed methods. The disclosed liquid crystal antenna 000 may minimize the influence caused by the resistance difference between different signal lines 50. At the same time, by splicing multiple disclosed liquid crystal antennas 000 to meet the requirements of the high communication rate, the disclosed liquid crystal antenna 000 may be applied to a scene that requires a substantially high communication rate.

It should be noted that FIG. 32 merely exemplarily illustrates quantities of transmission electrodes 40 and signal terminals 70, and the division manner of each sub-region of the first region AA as an example. In specific implementation, the quantities of transmission electrodes 40 and signal terminals 70, and the division manner of each sub-region of the first region AA may be determined according to practical applications, which may not be limited by the present disclosure.

Figure 33:
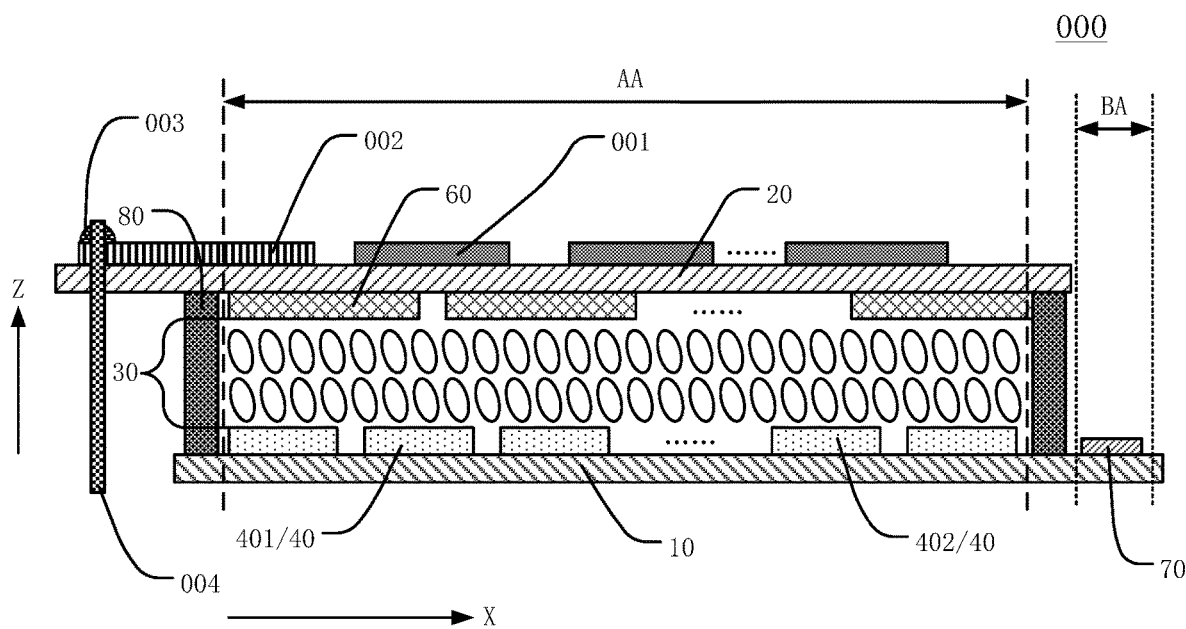
FIG. 33 illustrates a schematic diagram of another exemplary liquid crystal antenna consistent with disclosed embodiments of the present disclosure.

FIG. 33 illustrates a schematic diagram of another liquid crystal antenna consistent with disclosed embodiments of the present disclosure. In certain embodiments, referring to FIG. 33, the liquid crystal antenna 000 may further include a radiator 001. The radiator 001 may be disposed on the side of the second substrate 20 away from the first substrate 10.

In the present disclosure, in the direction Z perpendicular to the plane of the first substrate 10, the radiator 001 may be disposed on the side of the second substrate 20 of the liquid crystal antenna 000 away from the first substrate 10. In certain embodiments, referring to FIG. 33, the liquid crystal antenna 000 may further include a feed wire 002, a pad 003, and a signal introduction rod 004. The pad 003 may be configured to electrically connect the signal introduction rod 004 and the feed wire 002. The ground electrode 60 may be obtained by hollowing out the entire metal layer. It should be understood that FIG. 33 may not limit the structure of the liquid crystal antenna 000, and the liquid crystal antenna 000 may include any other structure according to practical applications.

Optionally, the process of the liquid crystal antenna 000 in FIG. 33 transmitting the microwave signal may include following. After receiving the microwave signal, the signal introduction rod 004 may transmit the microwave signal to the feed wire 002. The microwave signal may be coupled to the transmission electrode 40 on the first substrate 10 through the liquid crystal layer 30 at the hollow position of the ground electrode 60, and may be further coupled to the radiator 001 through the liquid crystal layer 30 at the hollow position of the ground electrode 60, and then the microwave signal may be emitted from the radiator 001. The process of the liquid crystal antenna 000 receiving the microwave signal may include following. The radiator 001 may receive the microwave signal. The microwave signal may be coupled to the transmission electrode 40 through the liquid crystal layer 30 at the hollow position of the ground electrode 60, may further be coupled to the feed wire 002 through the liquid crystal layer 30 at the hollow position of the ground electrode 60, may be transmitted from the feed wire 002 to the signal introduction rod 004, and then may be outputted by the signal introduction rod 004.

The liquid crystal antenna in the present disclosure may include at least following beneficial effects. The liquid crystal antenna may include the first substrate and the second substrate that are oppositely disposed, and the liquid crystal layer. The plurality of transmission electrodes arranged in an array may be disposed on the side of the first substrate facing toward the second substrate, and a ground electrode may be disposed on the side of the second substrate facing toward the first substrate.

The microwave signal may be transmitted between the transmission electrode and the ground electrode. During the transmission of the microwave signal, by controlling the voltages on the transmission electrode and the ground electrode, the intensity of the electric field formed between the transmission electrode and the ground electrode may be controlled, and then the deflection angle of the liquid crystal molecules of the liquid crystal layer in the corresponding space may be adjusted, thereby achieving the effect of changing the phase of the microwave.

Each transmission electrode of the liquid crystal antenna may be independently controlled by at least one signal line electrically connected to the signal terminal. For any two first transmission electrode and second transmission electrode along the first direction, with respect to the binding region, the first transmission electrode may be located at the far end of the binding region, and the second transmission electrode may be located at the near end of the binding region. The plurality of signal lines may at least include the first signal line and the second signal line. The first signal line may be configured to achieve signal transmission between the first signal terminal in the binding region and the first transmission electrode in the first region, and the second signal line may be configured to achieve signal transmission between the second signal terminal in the binding region and the second transmission electrode in the first region.

Although in the first direction, the distance between the first transmission electrode and the binding region is different from the distance between the second transmission electrode and the binding region, the resistance difference between any two signal lines connected to the transmission electrodes with different distances from the binding region may be substantially small. The resistance of the first signal line may be A, and the resistance of the second signal line may be B, where A/B may be less than 10, to minimize resistance difference between different signal lines connected to the transmission electrode at the far end and the transmission electrode at the near end.

Thus, the time periods of charging the two transmission electrodes through different signal lines may be consistent as much as possible, and the intensity difference of the liquid crystal deflection electric fields at different positions may be reduced. Further, the fast or slow charging time period caused by the different resistances of the signal lines connected to the transmission electrode at the far end and the signal line connected to the transmission electrode at the near end may be prevented.

For example, the transmission electrode at the near end may be charged fast due to the small resistance of the signal line connected thereto, and the transmission electrode at the fare end may be charged slowly due to the large resistance of the signal line connected thereto. Thus, at a same time, the electric field between the transmission electrode at the far end and the ground electrode may not achieve a same intensity as the electric field between the transmission electrode at the near end and the ground electrode. Further, the intensities of the liquid crystal deflection electric fields at the far end and the near end may be different, which may cause a difference in the liquid crystal deflection, may cause an inaccurate phase control, and may affect the performance of the antenna.

In the present disclosure, the phase of the transmission electrode at the far end and the phase of the transmission electrode at the near end may be synchronously outputted as much as possible, and the phase control of the liquid crystal antenna may be substantially accurate, which may facilitate to improve the gain of the liquid crystal antenna and the phase accuracy of the entire liquid crystal antenna.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. A liquid crystal antenna, comprising:
   a first substrate and a second substrate that are oppositely disposed, and a liquid crystal layer disposed between the first substrate and the second substrate;
   a plurality of transmission electrodes arranged in an array and a plurality of signal lines that are disposed on a side of the first substrate facing toward the second substrate, and a ground electrode disposed on a side of the second substrate facing toward the first substrate; and
   a first region and at least one binding region, wherein:
   the first region and a binding region of the at least one binding region are arranged along a first direction, the plurality of transmission electrodes are located in the first region, and a plurality of signal terminals sequentially arranged along a second direction are located in the binding region, wherein the first direction intersects the second direction,
   a transmission electrode of the plurality of transmission electrodes is electrically connected to a signal terminal of the plurality of signal terminals through at least one signal line of the plurality of signal lines,
   along the first direction, the plurality of transmission electrodes at least include a first transmission electrode and a second transmission electrode, and the first transmission electrode is located on a side of the second transmission electrode away from the binding region,
   the plurality of signal lines at least include a first signal line and a second signal line, the plurality of signal terminals at least include a first signal terminal and a second signal terminal, the first transmission electrode is connected to the first signal terminal through the first signal line, and the second transmission electrode is connected to the second signal terminal through the second signal line, and
   a resistance of the first signal line is A, and a resistance of the second signal line is B, wherein A/B is less than 10.

2. The liquid crystal antenna according to claim 1, wherein:
   along the first direction, the transmission electrode is not disposed between the second transmission electrode and the binding region, and the transmission electrode is not disposed between the first transmission electrode and a first edge, wherein the first edge is an edge of the first substrate away from the binding region.

3. The liquid crystal antenna according to claim 1, wherein:
   the resistance of the first signal line is equal to the resistance of the second signal line.

4. The liquid crystal antenna according to claim 1, wherein:
   the first signal line includes at least one first sub-segment and at least one second sub-segment, and
   in a direction parallel to a plane of the first substrate and along a direction perpendicular to an extension direction of the first signal line, a width of a first sub-segment of the at least one first sub-segment is greater than a width of a second sub-segment of the at least one second sub-segment.

5. The liquid crystal antenna according to claim 4, wherein:
   the width of the second sub-segment is equal to a width of the second signal line.

6. The liquid crystal antenna according to claim 4, wherein:
   the second signal line includes at least one third sub-segment and at least one fourth sub-segment, wherein a width of a third sub-segment of the at least one third sub-segment is greater than a width of a fourth sub-segment of the at least one fourth sub-segment, the width of the third sub-segment is equal to the width of the first sub-segment, and the width of the fourth sub-segment is equal to the width of the second sub-segment; and
   a length of the fourth sub-segment is greater than a length of the second sub-segment.

7. The liquid crystal antenna according to claim 6, further including:
   a second region between the first region and the binding region along the first direction, wherein the first sub-segment and the third sub-segment are located in the first region, and the second sub-segment and the fourth sub-segment are located in the second region.

8. The liquid crystal antenna according to claim 6, wherein:

the at least one first sub-segment and the at least one second sub-segment are alternately connected in sequence, and the at least one third sub-segment and the at least one fourth sub-segment are alternately connected in sequence.

9. The liquid crystal antenna according to claim 1, wherein:
a length of the first signal line is equal to a length of the second signal line.

10. The liquid crystal antenna according to claim 9, wherein:
the second signal line includes a fifth sub-segment and a sixth sub-segment, wherein the fifth sub-segment has a straight line structure, and the sixth sub-segment has a polyline structure or a curved structure; and
a third region between the first region and the binding region along the first direction, wherein the fifth sub-segment is located in the first region, and the sixth sub-segment is located in the third region.

11. The liquid crystal antenna according to claim 1, wherein:
the first signal line is made of a same material as the second signal line,
along a direction perpendicular to a plane of the first substrate, a thickness of the first signal line is equal to a thickness of the second signal line, and
a width of the first signal line is greater than a width of the second signal line.

12. The liquid crystal antenna according to claim 1, wherein:
the first signal line is made of a material including a first material, and the second signal line is made of a material including a second material, wherein a resistivity of the first material is smaller than a resistivity of the second material.

13. The liquid crystal antenna according to claim 1, wherein:
along a direction perpendicular to a plane of the first substrate, a thickness of the first signal line is equal to a thickness of the second signal line,
a width of the first signal line is equal to a width of the second signal line, and
the first signal line includes a seventh sub-segment located in a first film layer and an eighth sub-segment located in a second film layer, wherein the seventh sub-segment is electrically connected to the eighth sub-segment, and the second signal line is located in the first film layer.

14. The liquid crystal antenna according to claim 13, wherein:
a resistivity of a material for forming the eighth sub-segment is smaller than a resistivity of a material for forming the second signal line.

15. The liquid crystal antenna according to claim 1, wherein:
a signal line of the plurality of signal lines at least includes a first portion and a second portion, wherein one end of the first portion is connected to the transmission electrode, another end of the first portion is connected to one end of the second portion, and another end of the second portion is connected to the signal terminal, wherein:
an extension direction of the first portion intersects an extension direction of the second portion, and
a distance between the second portion and the transmission electrode is greater than or equal to 100 μm.

16. The liquid crystal antenna according to claim 15, further including:
a plurality of choke structures disposed on the side of the first substrate facing toward the second substrate, wherein a choke structure of the plurality of choke structures is connected to the first portion of the signal line, and an extension direction of the choke structure intersects the extension direction of the first portion; and
the choke structure has a structure including one of a straight line structure, a curved structure, and a sector structure.

17. The liquid crystal antenna according to claim 1, wherein:
the binding region includes a first binding region, a second binding region, a third binding region, and a fourth binding region, wherein the first binding region and the second binding region are disposed on opposite sides of the first region along the first direction, and the third binding region and the fourth binding region are disposed on opposite sides of the first region along the second direction;
the first region includes a first sub-region close to the first binding region, a second sub-region close to the second binding region, a third sub-region close to the third binding region, and a fourth sub-region close to the fourth binding region; and
the transmission electrode in the first sub-region is connected to the signal terminal in the first binding region through the at least one signal line, the transmission electrode in the second sub-region is connected to the signal terminal in the second binding region through the at least one signal line, the transmission electrode in the third sub-region is connected to the signal terminal in the third binding region through the at least one signal line, and the transmission electrode in the fourth sub-region is connected to the signal terminal in the fourth binding region through the at least one signal line.

18. The liquid crystal antenna according to claim 17, wherein:
the ground electrode is connected with a plurality of input terminals, and the plurality of input terminals are evenly arranged surrounding the first region.

19. The liquid crystal antenna according to claim 1, wherein:
the binding region includes a fifth binding region and a sixth binding region, wherein:
the fifth binding region and the sixth binding region are disposed on opposite sides of the first region along the first direction, or
the fifth binding region and the sixth binding region are disposed on opposite sides of the first region along the second direction;
the first region includes a fifth sub-region close to the fifth binding region, and a sixth sub-region close to the sixth binding region; and
the transmission electrode in the fifth sub-region is connected to the signal terminal in the fifth binding region through the at least one signal line, and the transmission electrode in the sixth sub-region is connected to the signal terminal in the sixth binding region through the at least one signal line.

20. The liquid crystal antenna according to claim 1, further including:

a radiator disposed on a side of the second substrate away from the first substrate.

\* \* \* \* \*